United States Patent
Lee

(10) Patent No.: US 12,309,403 B2
(45) Date of Patent: May 20, 2025

(54) METHODS AND SYSTEMS FOR TRANSCODING BETWEEN FRAME-BASED VIDEO AND FRAME FREE VIDEO

(71) Applicant: Solsona Enterprise, LLC, San Diego, CA (US)

(72) Inventor: Chong Lee, Carlsbad, CA (US)

(73) Assignee: Solsona MultiMedia, Inc., San Diego, CA (US)

( * ) Notice: Subject to any disclaimer, the term of this patent is extended or adjusted under 35 U.S.C. 154(b) by 805 days.

(21) Appl. No.: 17/447,582

(22) Filed: Sep. 14, 2021

(65) Prior Publication Data

US 2021/0409742 A1    Dec. 30, 2021

Related U.S. Application Data

(63) Continuation-in-part of application No. 16/839,136, filed on Apr. 3, 2020, now Pat. No. 11,258,978.

(60) Provisional application No. 63/199,039, filed on Dec. 3, 2020, provisional application No. 62/875,404, filed on Jul. 17, 2019.

(51) Int. Cl.
*H04N 19/40* (2014.01)
*H04N 19/172* (2014.01)
*H04N 19/182* (2014.01)
*H04N 19/184* (2014.01)
*H04N 19/192* (2014.01)

(52) U.S. Cl.
CPC .......... *H04N 19/40* (2014.11); *H04N 19/172* (2014.11); *H04N 19/182* (2014.11); *H04N 19/184* (2014.11); *H04N 19/192* (2014.11)

(58) Field of Classification Search
CPC .... H04N 19/40; H04N 19/172; H04N 19/182; H04N 19/184; H04N 19/192; H04N 19/587
See application file for complete search history.

(56) References Cited

U.S. PATENT DOCUMENTS

| | | |
|---|---|---|
| 5,248,971 A | 9/1993 | Mandl |
| 5,461,425 A | 10/1995 | Fowler et al. |
| 5,515,046 A | 5/1996 | Mandl |
| 5,659,315 A | 8/1997 | Mandl |

(Continued)

OTHER PUBLICATIONS

Wakin, Michael B.; "A Study of the Temporal Bandwidth of Video and its Implications in Compressive Sensing"; Colorado School of Mines Technical Report; Aug. 15, 2012; 50 pages.

(Continued)

*Primary Examiner* — Timothy J Henn
*Assistant Examiner* — John H Morehead, III
(74) *Attorney, Agent, or Firm* — Lipsitz & McAllister, LLC

(57) ABSTRACT

The present invention encompasses methods and systems of transcoding frame-based video to frame free video is provided. The method comprises receiving a frame-based video stream, upconverting the received frame-based video stream to produce an upconverted frame-based video stream at a higher frame rate than the received frame-based video stream, and modulating the upconverted frame-based video stream using discrete time sigma delta modulation to produce a frame free video stream. In addition, complimentary methods and systems are disclosed for transcoding frame free video to frame-based video.

21 Claims, 21 Drawing Sheets

(56) References Cited

U.S. PATENT DOCUMENTS

| | | | | |
|---|---|---|---|---|
| 5,886,659 | A * | 3/1999 | Pain | H04N 25/00 348/E3.018 |
| 6,597,371 | B2 | 7/2003 | Mandl | |
| 7,362,365 | B1 * | 4/2008 | Reyneri | H04N 3/155 348/297 |
| 9,200,954 | B2 * | 12/2015 | Lin | H04N 25/671 |
| 11,258,978 | B2 * | 2/2022 | Lee | H04N 25/78 |
| 2002/0050518 | A1 * | 5/2002 | Roustaei | G06K 7/10811 235/454 |
| 2002/0063807 | A1 * | 5/2002 | Margulis | G06T 1/20 348/745 |
| 2007/0063996 | A1 * | 3/2007 | Childers | H04N 9/3155 345/204 |
| 2008/0031325 | A1 * | 2/2008 | Qi | H04N 19/176 375/240.09 |
| 2009/0237516 | A1 * | 9/2009 | Jayachandra | H04N 19/523 348/208.4 |
| 2009/0295959 | A1 * | 12/2009 | Shoho | H04N 25/583 348/294 |
| 2010/0027664 | A1 * | 2/2010 | Sato | G09G 5/391 375/E7.243 |
| 2010/0316125 | A1 * | 12/2010 | Chappalli | H04N 19/587 375/E7.123 |
| 2011/0299597 | A1 * | 12/2011 | Freiburg | H04N 19/132 375/E7.125 |
| 2013/0112848 | A1 * | 5/2013 | Lin | H04N 25/671 250/206 |
| 2013/0222584 | A1 * | 8/2013 | Aoki | H04N 25/75 348/208.1 |
| 2013/0300900 | A1 * | 11/2013 | Pfister | G06V 40/176 348/239 |
| 2013/0308044 | A1 * | 11/2013 | Mitsunaga | H04N 25/531 348/362 |
| 2013/0329053 | A1 * | 12/2013 | Jones | H04N 5/33 348/302 |
| 2015/0092036 | A1 * | 4/2015 | Koshiba | H04N 25/78 348/71 |
| 2015/0245019 | A1 * | 8/2015 | Engelbrecht | H04N 17/002 348/175 |
| 2015/0350654 | A1 * | 12/2015 | Chung | H04N 19/46 375/240.06 |
| 2015/0382015 | A1 * | 12/2015 | Ahn | H04N 19/577 375/240.15 |
| 2016/0360138 | A1 * | 12/2016 | Meynants | H10F 39/18 |
| 2017/0041571 | A1 * | 2/2017 | Tyrrell | H04N 25/772 |
| 2017/0242108 | A1 * | 8/2017 | Dussan | G01S 7/4868 |
| 2018/0115774 | A1 * | 4/2018 | Su | H04N 19/186 |
| 2019/0026901 | A1 * | 1/2019 | Fu | H04N 25/75 |
| 2019/0253645 | A1 * | 8/2019 | Geese | H04N 23/745 |
| 2023/0097456 | A1 * | 3/2023 | Reckwerdt, Jr. | G09G 3/2003 345/690 |

OTHER PUBLICATIONS

Posch et al.; "A QVGA 143 dB Dynamic Range Frame-Free PWM Image Sensor With Lossless Pixel-Level Video Compression and Time-Domain CDS"; IEEE Journal of Solid-State Circuits; vol. 46, No. 1; Jan. 2011; pp. 259-275, 17 pages.

Mandl et al.; "All-digital monolithic scanning readout based on sigma-delta analog-to-digital conversion"; Proc. SPIE 1684, Infrared Readout Electronics; Jul. 1, 1992; pp. 238-246, 9 pages.

Mandl et al.; "Design of a 12-megapixel imager with a nanowatt A/D converter at each pixel"; Proc. SPIE 5074, Infrared Technology and Applications XXIX; Oct. 10, 2003; pp. 207-221, 15 pages.

Kang, et al.; "Motion Compensated Frame Rate Up-Conversion Using Extended Bilateral Motion Estimation"; IEEE Transactions on Consumer Electronics, col. 53, No. 4, Nov. 4, 2007; pp. 1759-1767, 9 pages.

Jiang, et al.; "Super SloMo: High Quality Estimation of Multiple Intermediate Frames for Video Interpolation"; CVPR 2018 Papers, Jul. 13, 2018; 12 pages.

* cited by examiner

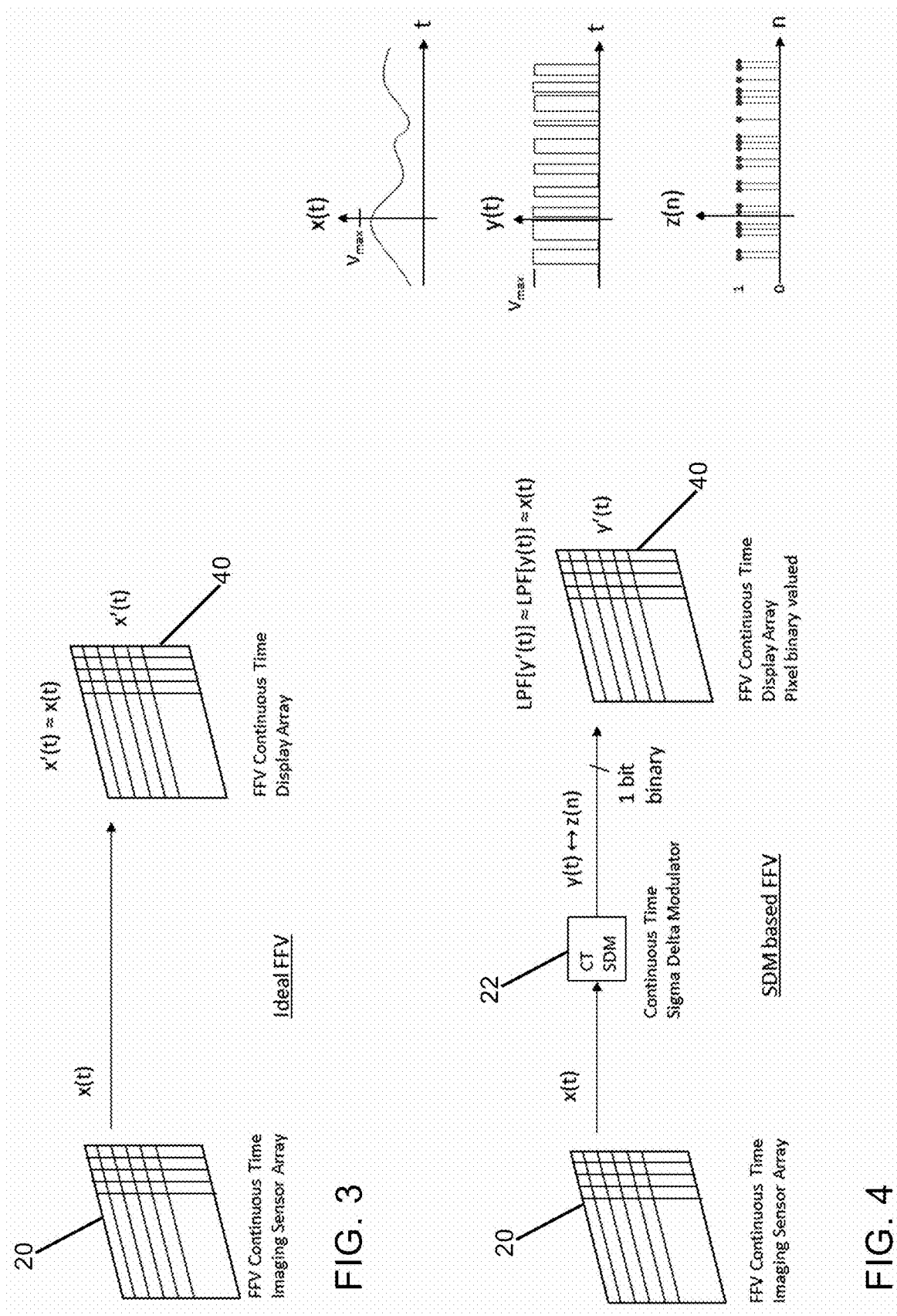

METHODS AND SYSTEMS FOR TRANSCODING BETWEEN FRAME-BASED VIDEO AND FRAME FREE VIDEO

This application claims the benefit of U.S. provisional patent application No. 63/199,039 filed on Dec. 3, 2020 and is a continuation-in-part of commonly-owned co-pending U.S. patent application Ser. No. 16/839,136 filed on Apr. 3, 2020, which claims the benefit of U.S. provisional patent application No. 62/875,404 filed on Jul. 17, 2019, and each of which is incorporated herein and made a part hereof by reference.

BACKGROUND OF THE INVENTION

The present invention relates to the field of video capture and display. More specifically, the present invention relates to methods and systems for transcoding from frame-based video to frame free video and vice versa.

Traditional video is frame-based video. Such frame-based video, including film-based movies, presents one frame of still picture after another in rapid succession, which produces the illusion of motion when the frame update rate is fast enough. Each "frame" is a complete static greyscale picture, which is readily apparent when the video or film is paused on one of the frames.

Eadweard Muybridge is credited with the first capture of motion on film in 1872 using an array of 12 cameras, as shown in FIG. 1. Modern video cameras still use the same basic principle discovered by Eadweard Muybridge in 1872. "Frame Rate" is one of the most prominent parameters in video. The higher the frame rate, the smoother the motion. Currently a frame rate of around 60 fps (frames per second) is used on most cameras. Typically, there is some information lost between the frames, due to shutter opening and closing, resulting in aliasing errors.

FIG. 2 shows an example embodiment of a prior art frame-based video process. In frame-based video, each frame of film or video is exposed when the shutter is open. In FIG. 2, the imaging sensor array 10 is comprised of pixels. The signal x(t) represents the incident photon flux (or photo current) at each pixel in the imaging array 10. An integrator 12 integrates x(t) integrated over $T_O$, the shutter open duration, to produce the signal y(t). The signal y(t) is sampled at the end of integration by a sample and hold amplifier S/H, reset (by discarding the incident photon) during $T_R$, the shutter closed duration, to produce the analog signal $y_s(t)$. During $T_R$, a new piece of film is positioned, or the photodiode is reset. The sample and hold amplifier S/H samples y(t) at down arrows to produce $y_s(t)$. The signal $y_s(t)$ is quantized and digitized by an analog to digital converter 14 to produce a digital signal z(n), which represents peak y(t) sampled and converted to a PCM (pulse code modulation) coded signal, representing one of the pixels in a 2-D image frame, at frame time n ($t=nT_S$). The digital signal z(n) can then be communicated over a transmission channel and converted at the destination back to an analog signal $y'_s(t)$ at a digital to analog converter 16. The signal $y'_s(t)$ is an approximation of the signal $y_s(t)$, and comprises the signal $y_s(t)$ plus quantization error. The display signal y'(t) at the display array 18 approximates the signal $y_s(t)$ and comprises a greyscale display output of the average brightness over one frame time. The signal y'(t) reproduces $y_s(t)$, which may have a different time profile than the shutter at the imaging sensor. The signal y'(t) is an approximation of x(t) except for the time aliasing due to the shutter time profile, finite integration window, and missing photons. This aliasing error cannot be separated out by any filtering. The bandwidth of y'(t) depends on the frame rate ($1/T_S$). The human visual system (HVS) has a response up to 60 Hz, requiring a frame rate greater than 120 Hz. However, when there is object motion or quick camera panning the temporal bandwidth of the scene often exceeds 60 Hz, therefore even 120 Hz is not sufficient. In those situations, the viewer sees multiple trailing edges or occasionally a stagecoach wheel turning backward.

It would be advantageous to overcome the inherent limitations of frame-based video and to enable video recording and playback in a manner more consistent with the human visual system. The methods, apparatus and systems of the present invention provide the foregoing and other advantages by providing methods and systems for transcoding a frame-based video stream to a frame free video stream. Methods and systems are provided for transcoding a frame free video stream to a frame-based video stream as well to enable backward compatibility with frame-based video displays.

SUMMARY OF THE INVENTION

The present invention provides methods and systems for transcoding frame-based video into frame free video (also referred to herein as "continuous time" video).

In particular, the present invention leverages the methods and systems of representing video in continuous time disclosed in commonly-owned co-pending U.S. patent application Ser. No. 16/839,136 filed on Apr. 3, 2020, which describes various embodiments for capturing, representing and displaying video in continuous time (without frame boundaries). In U.S. patent application Ser. No. 16/839,136, it is disclosed that the frame free video originates at a frame free video camera that converts the analog brightness value into Sigma Delta Modulated (SDM) frame free video signal. Continuous Time SDM (CT-SDM) at each pixel converts the photons incident on the photo diode and produces a digital representation of the brightness in continuous time. Even though the output of CT-SDM is a series of 1-bit samples, when oversampled at a high enough sampling rate (bit plane rate), the frame free video approaches a continuous time representation without any lost information.

Conversely, the conventional frame-based video represents each frame with multi-bit pulse code modulated (PCM) pixels. Due to the frame boundaries enforced during the camera capture process, frame-based video has an intrinsic aliasing and blur that cannot easily be undone unless the frame rate is extremely high. However, it is desirable and useful to derive an approximation of a frame free video signal from PCM pixels of frame-based video. Accordingly, until a frame free video camera is developed, frame free video can be derived from frame-based video captured by a conventional video or film camera (or generated by a computer simulation, computer special effects, or from electronic games).

In order to display frame-based video content on a frame free video display, transcoding is necessary. This transcoding from frame-based video to frame free video can be done all in the digital domain, since frame-based video is assumed to be in multi-bit PCM pixel format. A method of transcoding frame-based video is disclosed that utilizes a motion adaptive frame interpolation of frame-based video followed by a Discrete Time Sigma Delta Modulator (DT-SDM). DT-SDM is closely related to the Continuous Time Sigma Delta Modulator employed in the frame free video camera described in U.S. patent application Ser. No. 16/839,136.

Motion adaptive frame interpolation smoothly fills in the missing frames by estimating the location of the object or pixels based on the motion parameters. DT-SDM converts the multi-bit PCM frames to 1-bit SDM bit planes. The resulting frame free video will have higher temporal bandwidth, by artificially interpolating the missing frame-based video frames, thereby increasing the frame free video bit plane rate (DT-SDM generates one output bit plane from each input frame).

Motion adaptive frame interpolation can be assisted by Artificial Intelligence (AI) or Machine Learning (ML) techniques to reduce the chances of making interpolation errors. This transcoding from frame-based video to frame free video increases the frame free bit plane rate by OSR (Over Sampling Ratio) from the frame-based video frame rate. One input frame-based video frame produces OSR number of frame free video bit planes.

In addition, complimentary methods and systems are disclosed that transcodes frame free video to frame-based video. This is useful when the end application requires processing each frame or displaying frame free video in a conventional frame-based video display. This transcoding lowers the bit plane rate of frame free video by a factor of OSR to produce frame-based video at the desired frame rate. OSR number of frame free video bit planes produces one frame-based video frame. A low pass filter (LPF) involved in the decimation process can be any desired shape, even allowed to overlap into the previous frame or the next frame. The direction of the low pass filtering can by modified by motion parameters, in spatio-temporal 3-D space (horizontal, vertical, and temporal dimensions). This motion adaptive decimation can result in less blurring of moving objects while keeping the aliasing under control. The low pass filtering operation naturally sums many binary values from the frame free video bit planes multiplied by filter coefficients, and therefore produces multi-bit PCM pixels.

Finally, the result of the transcoding can be further processed or displayed in the respective displays, e.g. transcoded frame free video can be displayed on a frame free video display and transcoded frame-based video can be displayed on a conventional frame-based video display.

In accordance with one example embodiment of the present invention, a method of transcoding frame-based video to frame free video is provided. The method comprises receiving a frame-based video stream, upconverting the received frame-based video stream to produce an upconverted frame-based video stream at a higher frame rate than the received frame-based video stream, and modulating the upconverted frame-based video stream using discrete time sigma delta modulation to produce a frame free video stream.

The received frame-based video stream may be an uncompressed stream. Alternatively, the received frame-based video stream may be a compressed video stream. In such an instance, the compressed video stream may be decompressed to provide a decompressed frame-based video stream. The decompressed frame-based video stream may then be upconverted to produce the upconverted frame-based video stream.

The method may further comprise deriving motion parameters from the received frame-based video stream, and interpolating the received frame-based video stream prior to the modulating of the upconverted frame-based video stream using the derived motion parameters. The interpolating may comprise motion adaptive frame interpolation. The interpolating may be augmented by one of artificial intelligence or machine learning techniques.

The modulating may be carried out using a discrete time sigma delta modulator, wherein each pixel value in the upconverted frame-based video stream is integrated continuously by a digital integrator to produce an integrated value which represents the total cumulative pixel value over time. Each time the integrated value exceeds a threshold value, a fixed value is subtracted from the integrated value to keep the remaining integrated value within an operating range. The series of subtracted values over time results in a close approximation of the total integrated value, enabling the sigma delta modulator to produce a discrete time binary digital signal.

The sigma delta modulator may comprise the digital integrator, a slicer coupled to the output of the integrator for determining whether the integrated value from the integrator output exceeds the threshold value, the slicer output comprising discrete time binary digital signals, and a feedback gain loop coupled to an output of the slicer and the input of the digital integrator which produces the fixed value to be subtracted each time the integrated value exceeds a threshold value, enabling the digital integrator to operate within an operating range.

The received frame-based video stream may have a frame rate of K. The upconverted frame-based video stream may have a frame rate of OSR*K. The resulting frame free video stream will then have a bit plane rate of K'=OSR*K.

The method may further comprise displaying the frame free video stream on a frame free video display. The frame free video display may modulate the light at each pixel in the display in a binary on/off manner. The frame free video stream may comprise a single black and white channel, or multiple color channels such as red, green, and blue (or more). In the case of multiple channels, the display of each channel may optionally be staggered at a predetermined interval (e.g., the bit plane interval divided by the number of color channels). For example, in the case of red, green and blue color channels, the interval may comprise one third of a bit plane interval.

The present invention also encompasses a system of transcoding frame-based video to frame free video. In one example embodiment, the system comprises a receiver for receiving a frame-based video stream, an upconverter for upconverting the received frame-based video stream to produce an upconverted frame-based video stream at a higher frame rate than the received frame-based video stream, a sigma delta modulator for modulating the upconverted frame-based video stream using discrete time sigma delta modulation to produce a frame free video stream, and a frame free video display for displaying the frame free video stream.

The present invention further encompasses a method of transcoding frame free video to frame-based video. One example embodiment of the method comprises receiving a frame free video stream at a bit plane rate of K'=OSR*K, decimating the received frame free video stream by the OSR to produce a frame-based video stream at a frame rate of K.

The decimating may comprise low pass filtering and subsampling that results in multiple bits per pixel value. The decimating may also comprise motion adaptive decimation. The motion adaptive decimation may be augmented by one of artificial intelligence or machine learning techniques.

The method may further comprise deriving motion parameters from the frame free video stream and utilizing the motion parameters in the decimating process.

The method may also comprise displaying the frame-based video stream on a conventional frame-based video display.

A corresponding system for transcoding frame free video to frame-based video is also provided. One example embodiment of such a system may comprise a receiver for receiving a frame free video stream at a bit plane rate of K'=OSR*K, a transcoder for decimating the received frame free video stream by the OSR to produce a frame-based video stream at a frame rate of K, and a frame-based video display for displaying the frame-based video stream.

Various embodiments of the systems of the present invention may also encompass the features and functionality of the corresponding method embodiments discussed above.

BRIEF DESCRIPTION OF THE DRAWINGS

The present invention will hereinafter be described in conjunction with the appended drawing figures, wherein like reference numerals denote like elements, and:

FIG. 3 shows an example embodiment of a high-level frame free video process in accordance with the present invention;

FIG. 4 shows a further example embodiment of a frame free video process in accordance with the present invention;

DETAILED DESCRIPTION

Figure 1:
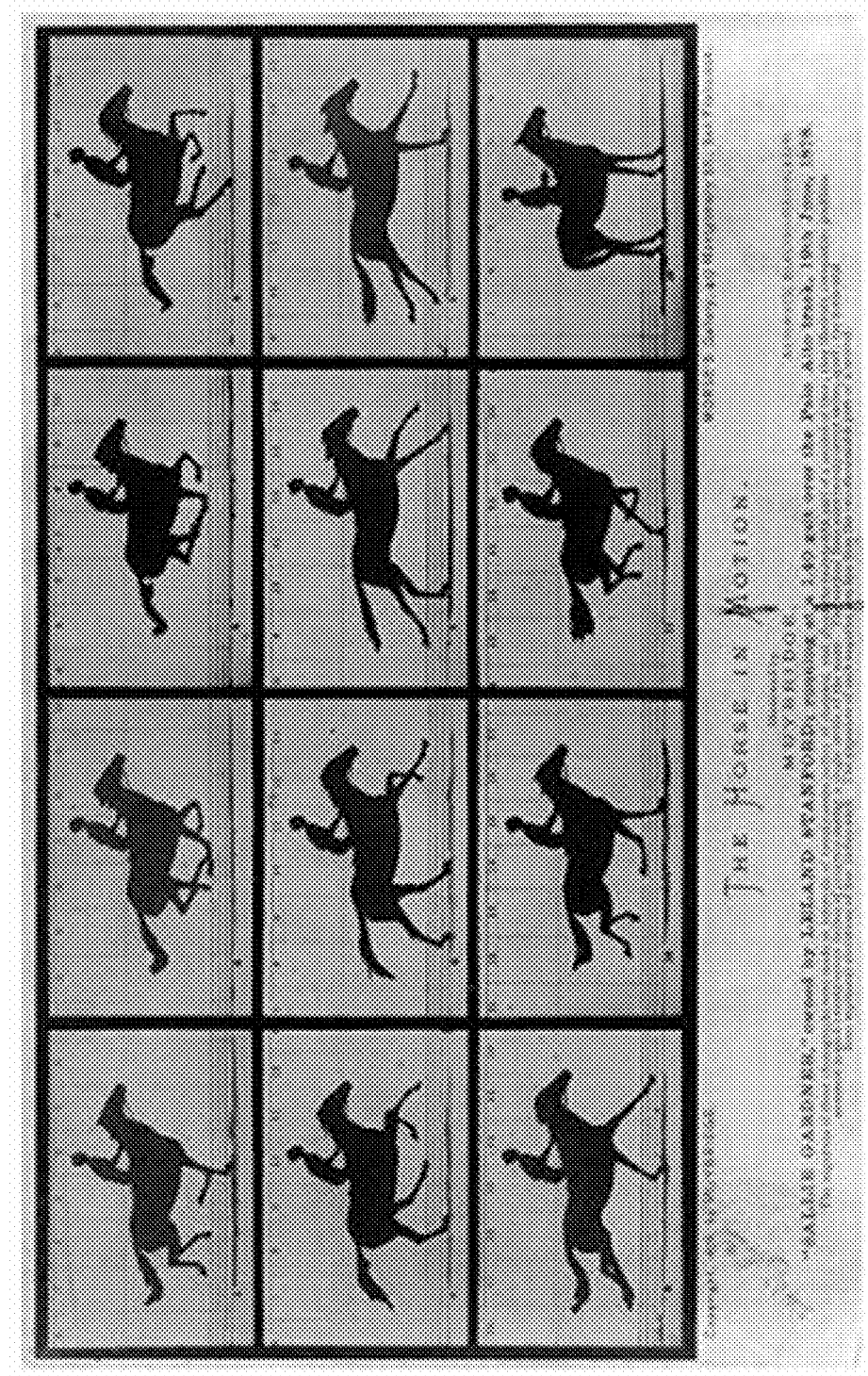
FIG. 1 shows a prior art image of the first motion capture on film.
Figure 2:
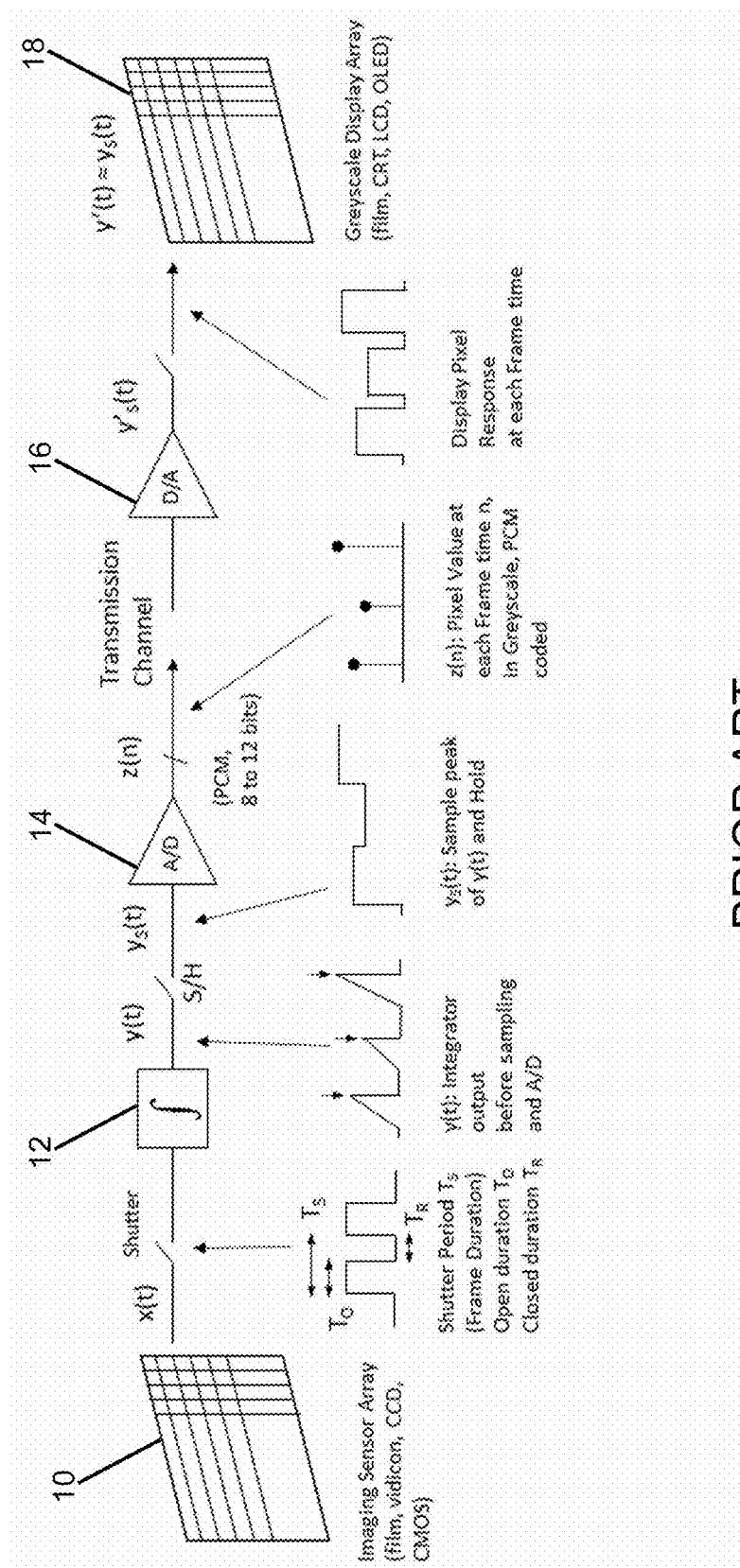
FIG. 2 shows an example of a prior art frame-based video process.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus, and systems for representing video in continuous time, also referred to herein as "frame free video". Frame free video refers to the fact that the video is captured without using traditional "frames" but rather as a continuous time representation, without any frame breaks.

Frame free video results in the capture and display of motion without the traditional frame breaks of frame-based video. The inventive process is based on the principal that frame rate is not fundamental in capturing motion, as the human eye does not have a frame rate. High temporal bandwidth is desirable, however.

Thus, frame free video is based on capturing video where the concept of frame rate is not used. Instead, video is captured in continuous time without any frame boundary. Sampling and digitization operations are performed, but these do not result in a traditional "frame". However, many samples (e.g., bit-planes) can be aggregated to reproduce a traditional frame if desired, in which case the frame boundary can be arbitrarily defined to suit the needs of the intended application. The continuous time video may be modulated into an oversampled signal representation using sigma delta modulation (SDM). The corresponding display can also use sigma delta modulation to reproduce the original video. Integration (LPF) that happens in the eye reproduces the complete scene.

Frame free video provides many advantages over frame-based video. Such advantages include:
  More accurate representation of the real world
    No aliasing error
    No loss of photons, no missing information
    Signal captured is continuous, analytic, differentiable, virtually analog
    Closest to how human eye works
    Improved realism
    Potentially easier to compress
    Suitable for computer vision analysis
  Improved camera capability
    In-pixel A/D conversion, producing digital readout and less circuit noise
    HDR, High Dynamic Range (potentially 1 to 2 orders of magnitude improvement)
    Adaptive exposure time for still images, possibly motion adaptive Signal to Noise Ratio (SNR) very high at slow motion, moderate at fast motion
  Eye tracking of fast-moving objects results in high SNR
    Avoids multiple trailing edges when eye tracks a moving object
Transcoding for backward compatibility
  Easy conversion to frame based PCM video
  Motion adaptive denoising, blur control possible
All digital display possible using SDM, that maps exactly what the camera produced
Low delay from camera to display, for low latency applications
  RPV, drones, autonomous driving, computer games, anything involving fast reaction time The frame free video camera sensor array may be a retrofit to an existing CMOS sensor array (e.g., with some circuit changes). The frame free video display array may be implemented with existing display technologies that offer fast binary modulation of pixels.

Frame free video may be implemented as an end-to-end system, starting with continuous photon capture, all the way to a native frame free video display system. Frame-based video requires integration in the human eye to see continuous motion. Frame Free Video causes integration in the eye as well, but requires less effort and produces less artifacts. In the frame free video process, a 1-bit oversampled representation of photon flux on each pixel is produced. If needed, the signal can be re-modulated after gamma correction, color processing, etc. or to higher order SDM. Second or third order SDM at the pixel level is also possible with more transistors. Charge mode sensing of the photodiode, direct modulation into SDM without conversion to voltage can all be implemented. Charge mode feedback to the photodiode that avoids diode reset is used to keep the photodiode constantly biased and to avoid a gap between samples. This also reduces chances of non-linearity and photodiode saturation, and leads to high dynamic range. The system advantageously produces an all digital readout of pixel values, without the need for an analog sense amplifier for the imaging array, resulting in less noise.

In many cases, there is no shutter needed at the sensor level. A shutter introduces unwanted time aliasing, unless a specific visual effect is desired. The system may include electronic gain control by way of changing the feedback gain in the SDM loop, e.g., for low light situations. A continuous time SDM typically incorporates an op-amp circuit to implement an integrator. This op-amp supply current may be increased for high photon flux. Alternatively, the op-Amp bias current may be modulated on and off with an adaptable duty cycle to save power consumption. For example, a lower on/off frequency or shorter "on" duty cycle may be used when the photon flux is low. SDM modulation rate may be dynamically adjusted to avoid saturation and to increase dynamic range and SNR. SDM modulation rate can also be changed to adapt to different motion bandwidth needs. Mechanical or electronic iris (or dimming) may be employed for intense lighting conditions. For extremely intense lighting conditions, the op-amp integrator input can be reconfigured to integrate only a portion of the photodiode current during each SDM clock cycle.

With the present invention, manipulation is possible in the SDM bit-stream domain. For example: temporal filtering (time domain blur or sharpening) and re-modulation back to SDM; motion axis filtering (in the direction of motion) and remodulation back to SDM; color space conversion, matrixing, and remodulation back to SDM; gamma correction and remodulation back to SDM; video gain and offset control, and remodulation back to SDM, and the like.

In some cases, the continuous time video may be represented by a series of SDM binary bit-planes without any frame boundary, which can be displayed directly by a display that displays SDM binary bit-planes. In some cases, all photons are captured without any discontinuity. In such cases, the photodiode is never reset, and the diode voltage is kept constant.

In an ideal conceptualization of the present invention, as shown in FIG. 3, a continuous time imaging sensor array 20 is used to map, continuously in time for each pixel, the pixel value x(t) (photons incident on the pixel) directly to a continuous time display pixel value x'(t) for display at a continuous time display array 40. However, many factors reduce the bandwidth of x(t), including the sensor response speed of the imaging sensor array 20, the communications channel bandwidth, and the display pixel response at the display array 40. Also, accurately transferring all the analog pixel values from the sensor array to the display array is very difficult through a single communications channel. Temporarily and permanently storing the analog pixel values is difficult as well without some form of digitization. Thus, such an implementation is conceptually possible but not practical.

FIG. 4 shows a more practical embodiment of the present invention. In the FIG. 4 example embodiment, a continuous time sigma delta modulator (SDM) 22 is employed between the imaging sensor array 20 and the display array 40. In the FIG. 4 embodiment, the output x(t) for each pixel of the sensor array 20 is a continuous time analog signal. The continuous time analog signal x(t) is modulated by the continuous time SDM at high clock rate to produce y(t), which is a continuous time binary analog signal. Y(t) can be digitized into a discrete time binary digital signal z(n) for transmission and storage. The signal y(t) contains x(t), with additive noise that can be filtered out by a low pass filter (LPF). The display array 40 reproduces y'(t), an approximation of y(t). The human visual system (HVS) filters out the noise in y(t), and sees a close approximation of x(t). The LPF operation becomes easier as the SDM clock rate is increased.

Figure 5:
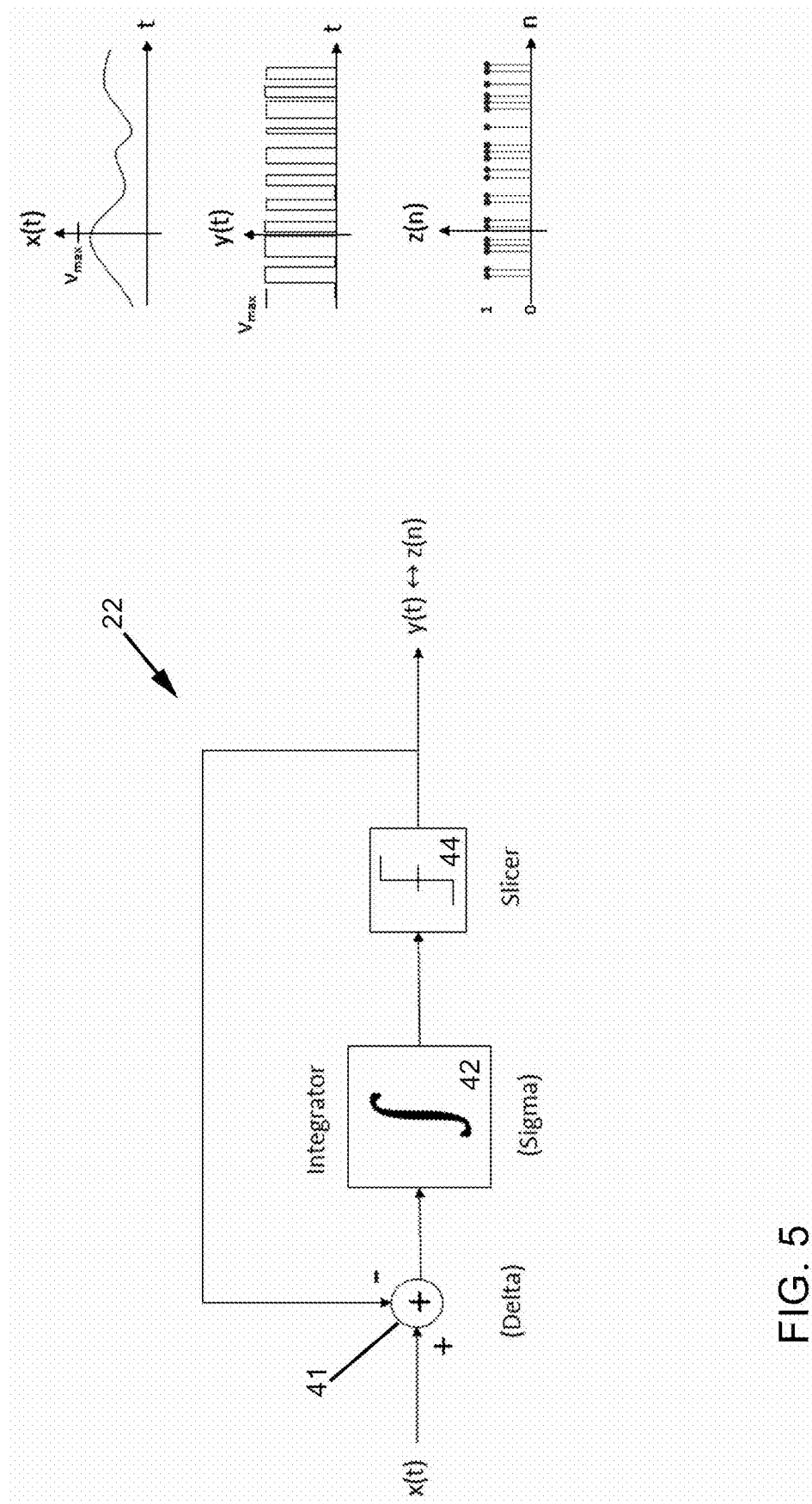
FIG. 5 shows an example embodiment of basic first order continuous time sigma delta modulator in accordance with the present invention.

FIG. 5 shows an example embodiment of a basic first order continuous time sigma delta modulator 22 in accordance with the present invention, which comprises an integrator 42 and a slicer 44, that can be employed in the system of FIG. 4. The photodiode signal x(t) is integrated continuously in time by the integrator 42. The resultant signal is then fed into a slicer 44, which outputs the continuous time binary analog signal y(t), which can then be digitized to produce the discrete time binary digital signal z(n). A feedback loop is provided between the output of the slicer 44 and the input of the integrator 42 such that the integrator 42 operates only on the difference signal produced by the delta operation (e.g., performed by a differential amplifier circuit). This completes the SDM loop that keeps the integrator stable, and produces y(t) representing the continuous time binary analog signal that closely approximates the photodiode signal x(t).

Figure 6:
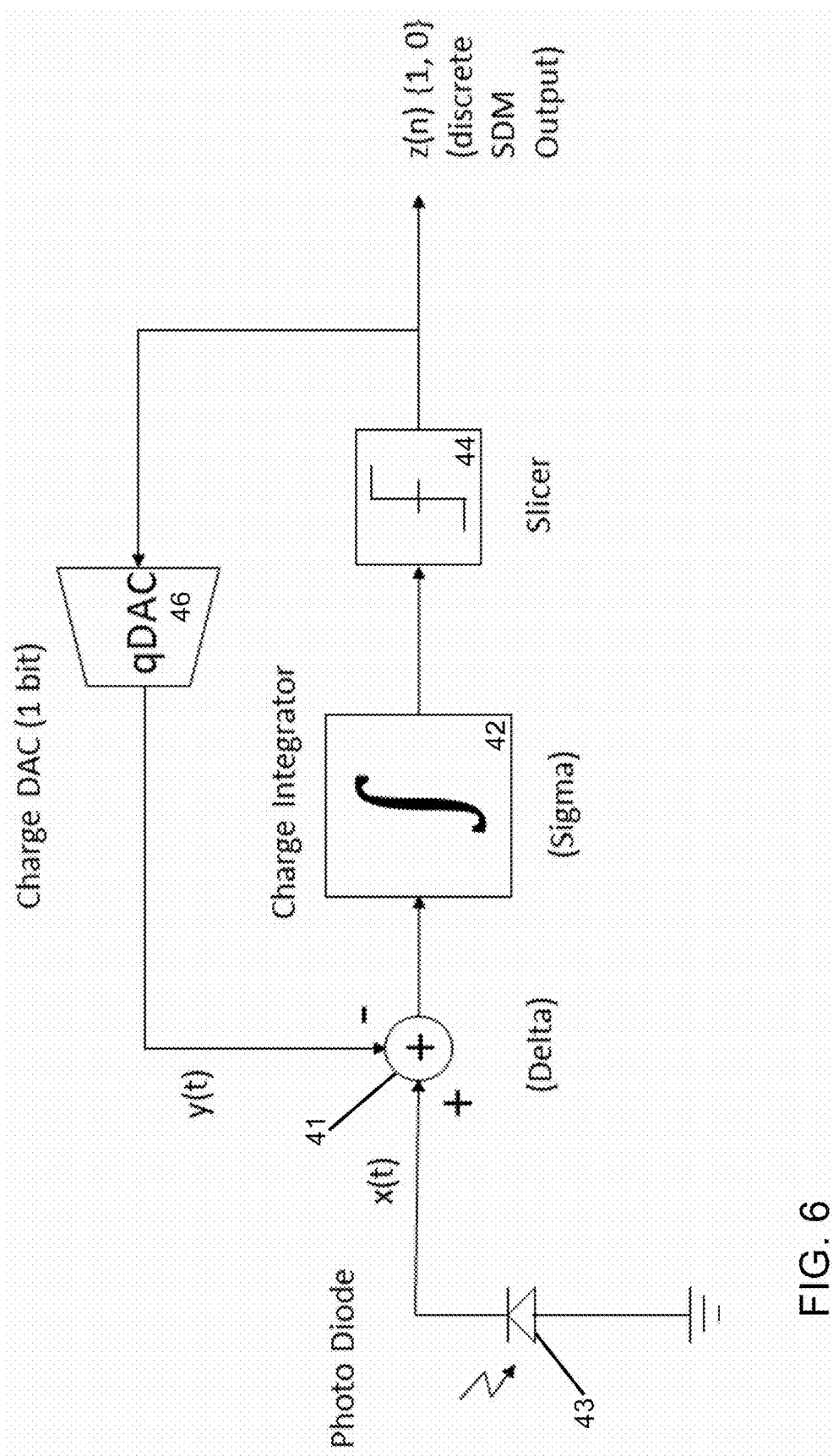
FIG. 6 shows an example embodiment of a high-level pixel design in accordance with the present invention.

FIG. 6 shows an example embodiment of an individual pixel circuit of a sensor array 20 which comprises a high-level SDM design in accordance with the present invention. The pixel circuit of FIG. 6 includes the photodiode 43 which outputs the signal x(t) into a delta operation 41. In this example embodiment, the feedback loop now includes a charge DAC (digital to analog converter) which produces the signal y(t) from the output of the slicer 44 for subtraction from the input signal x(t). In this embodiment, x(t) and y(t) are represented in current, not voltage.

It is important to note that the photodiode is not reset and the integrator 42 is not reset either. It's possible to view that the integrator output is A/D converted using a 1-bit A/D converter, which is the slicer 44 (threshold to high or low binary decision). In that case, the quantization error is rather large. The advantage of the SDM loop is that the quantization error is fed-back to the integrator 42, which gets combined with the next input value. This error value in each cycle gets integrated over time, and averages out so that a very high SNR can be achieved. In contrast, in frame-based systems, the quantization error in one cycle (frame time) gets lost, due to the reset process, and the SNR is limited by the resolution of the A/D converter, typically 8-bits.

It should also be appreciated that a traditional implementation of an SDM is in voltage. However, with the present invention, the SDM circuit is either charge or current based (which are interchangeable in a real implementation). Signal y(t) is shown as a plot of current output. Current integrated over a period of time is charge.

Figure 7:
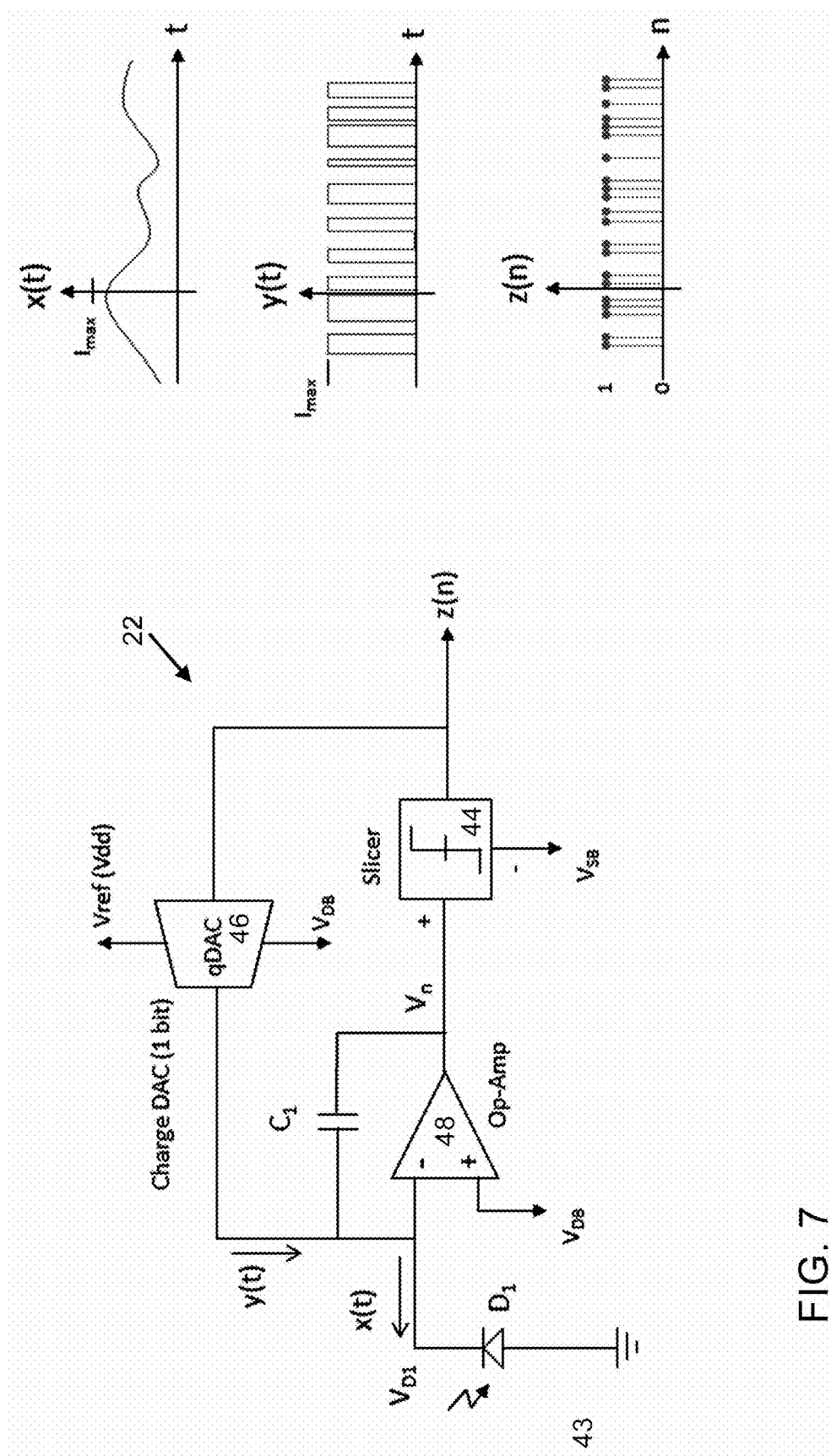
FIG. 7 shows a further example embodiment of a pixel design in accordance with the present invention where the charge integration is accomplished by an inverting op-amp integrator.

FIG. 7 shows a further example embodiment of a pixel circuit with a more detailed SDM design than that of FIG. 6, in accordance with the present invention. In FIG. 7, the SDM comprises a 1-bit continuous time sigma delta modulator in the charge domain, which employs an inverting op-amp charge integrator circuit.

It should be appreciated that in various embodiments of the present invention, the sigma delta modulator comprises a feedback-based charge integrator that is connected to the photodiode. The photodiode is not reset throughout the operation of the imaging array. Continuous feedback from the feedback-based charge integrator maintains a constant photodiode voltage.

The photodiode current x(t) is integrated continuously in time without saturating the photodiode 43 by the feedback-based charge integrator to produce an integrated value which represents total photons converted to electrical charges. Each time the integrated value exceeds a threshold value, a fixed value is subtracted from the integrated value to bring the integrator output to below the threshold. The series of subtracted values over time results in a close approximation of the total integrated value, enabling the sigma delta modulator to produce the continuous time binary analog signal y(t) that can be mapped to the discrete time binary digital signal z(n).

As shown in FIG. 7, the sigma delta modulator further comprises an op-amp 48 with a non-inverting input held at a constant voltage and an inverting input coupled to an output of the photodiode 43. The op-amp 48 outputs the integrated value. A feedback capacitor $C_1$ is coupled to an output of the op-amp 48 and the output of the photodiode 43 to maintain the constant photodiode voltage. The slicer 44 is coupled to the output of the op-amp 48 for determining whether the integrated value from the op-amp 48 output exceeds the threshold value. The slicer output comprises the discrete time binary digital signals z(n). A charge digital to analog converter (qDAC) 46 is coupled to an output of the slicer 44 and the inverting input of the op-amp 48 which produces the fixed value to be subtracted.

It should be noted that the slicer output can often be considered an analog signal y(t). However, in a practical implementation, it is easier to obtain the digital signal z(n) from the slicer, and then insert a D/A converter (charge DAC 46 in FIG. 7) in the feedback loop to generate y(t).

With the present invention, the signal y(t) is a continuous time binary analog signal produced by the slicer 44 and the qDAC 46, and z(n) is the discrete time binary digital signal produced by the slicer 44. In certain implementations, sometimes the slicer can generate y(t) directly if it produces the right two voltage levels, but with the present invention, since charge injection is needed, it is advantageous for the slicer to output the digital signal z(n) and employ a charge DAC to generate y(t).

The photodiode 43 is reverse biased at $V_{D1}$ (indirectly by the op-amp voltage $V_{DB}$). As the photodiode 43 receives photons, the photo electric current x(t) is generated. This in turn discharges the built-in capacitance of this reverse biased diode 43. Diode voltage $V_{D1}$, which is connected to the negative input of the Op-Amp 48, would drop. The feedback from the Op-Amp 48 charges up the capacitor $C_1$ to keep its negative input $V_{D1}$ constant at $V_{DB}$. This results in the photo electric current being transferred to the integrator capacitor $C_1$. The end result is that the photo electric current x(t) from the diode is continuously accumulated in $C_1$ while keeping the diode voltage $V_{D1}$ held constant at $V_{DB}$. This forms the "charge domain integrator" part of the SDM circuit.

The feedback capacitor $C_1$ accumulates the charge for the charge-based SDM. Voltage on the capacitor is the total charge divided by its capacitance. In order to maintain a fixed voltage on the photodiode 43, the output voltage of the op-amp 48 changes by this capacitor voltage.

Assuming the Op-Amp 48 has a high gain, the diode bias voltage $V_{DB}$ applied to the positive input of the Op-Amp 48 will keep the negative input of the Op-Amp also at $V_{DB}$. The voltage output of the Op-Amp 48 is proportional to the total charge accumulated into $C_1$. Once the integrator output (Op-Amp output) exceeds a threshold set by $V_{SB}$, the Slicer 44 makes a one-bit decision and outputs z(n)=1. The qDAC 46 produces y(t), a fixed amount of charge that gets subtracted from the integrator. This discharges $C_1$ without changing the diode voltage, due to the Op-Amp feedback. When the Slicer decision z(n)=0, no charge is subtracted from the integrator. This outer feedback (SDM feedback) keeps the integrator output stable, within the set voltage range centered around $V_{SB}$. This Slicer decision z(n) is also the output of the FFV pixel at that time instance (SDM clock). Each 1-bit decision z(n) from an array of pixels in an image sensor form the "SDM bit-plane", for an L×M array. The frame free video stream is comprised of a series of these SDM bit-planes in time, with L×M binary values per bit-plane.

It should be noted that there are a number of alternative ways to connect the photodiode to the inverting op-amp charge integrator in FIG. 6. One alternative would be to connect the anode of the photodiode to the inverting input of the op-amp and connect the cathode of the photodiode to another voltage. Another alternative would be to connect the anode of the photodiode to another voltage instead of the ground. Yet another alternative would be to connect the anode of the photodiode to the non-inverting input of the op-amp. They all lead to the continuous integration of the photo current from the photodiode but may provide different design optimizations, including linearity and dark current.

Because the photon has been integrated continuously without a gap in time, the frame free video is an analog representation of the photon flux at each pixel. It should be noted that the representation is a continuous time analog representation but has a large amount of noise introduced, where noise is mitigated by oversampling.

The over sampling ratio (OSR) determines the quality of the signal. A useable range is typically between 8× to 128× for video. For a 60 Hz (FPS) conventional video, the highest motion bandwidth allowed is 30 Hz. At 16× OSR, frame free video will have 960 Hz bit-plane rate (SDM clock rate), which allows a motion bandwidth up to 480 Hz.

The integrator in the frame free video pixel is a low-pass filter in the continuous time domain. It avoids aliasing that is present in conventional frame-based video. The Human Visual System (HVS) has a bandwidth that peaks around 20 Hz, and drops off to zero around 60 Hz. HVS (naked eye) will provide sufficient temporal filtering to see the original video content from the FFV stream, but not the noise.

Figure 8:
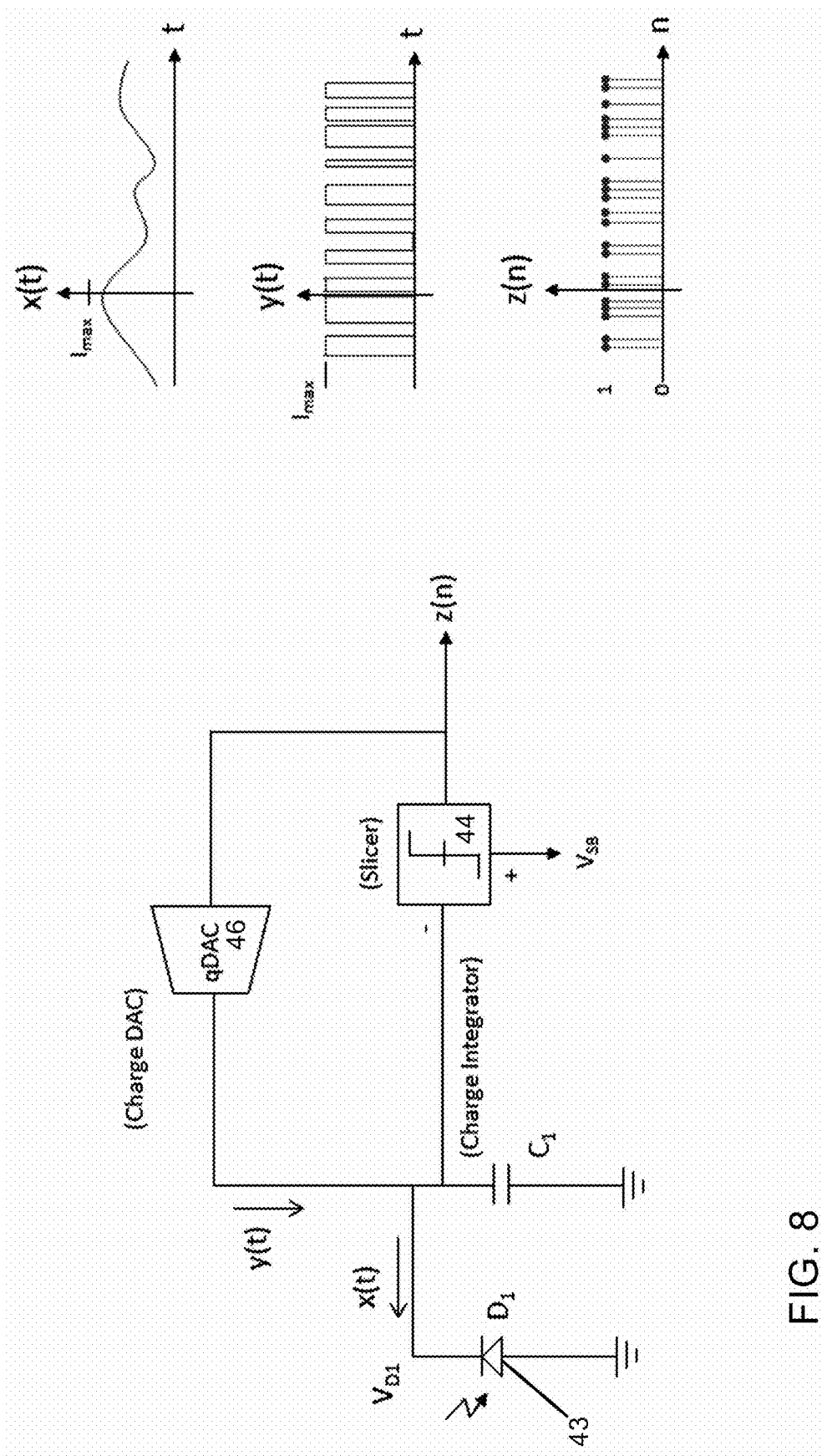
FIG. 8 shows a further example embodiment of a pixel design in accordance with the present invention where the charge integration is accomplished by a capacitor.

FIG. 8 shows a further example embodiment of a pixel circuit with a simplified SDM design as compared to that of FIG. 7, in accordance with the present invention. In FIG. 8, the SDM comprises a 1-bit continuous time sigma delta modulator in the charge domain as in FIG. 7, but the op-amp charge integrator circuit is replaced by a simple capacitor $C_1$ functioning as the charge integrator, without the need for the feedback capacitor of the FIG. 7 design.

The FIG. 8 embodiment provides a more sensitive slicer circuit with a higher SDM (qDAC) update rate, which keeps $V_{D1}$ nearly constant (within e.g., 10-20 mV) with the slicer 44 biased at $V_{SB}$.

As in the FIG. 7 embodiment discussed above, the signal x(t) is the current flowing into the reverse biased photodiode 43 when the diode 43 is exposed to light. The signal y(t) is a continuous time binary analog signal produced by the slicer 44 and the qDAC 46, and z(n) is the discrete time binary digital signal produced by the slicer 44. The output of the capacitor C1 is non-inverting and so is connected to the negative input of the slicer 44 (whereas the op-amp 48 of the FIG. 7 embodiment is inverting and so is connected to the positive input of the slicer 44). Signals z(n) and y(t) (output of qDAC 46) add charge (positive current) to the integrator $C_1$ in a manner to compensate for the charge (current) taken out of the integrator by the photo diode. If the integrator is too low, it adds a fixed amount of charge. If the integrator is high, it skips the cycle and waits for the photo diode to bring it low. This feedback keeps the integrator stable, by keeping it within a narrow range.

The design of FIG. 8 can be implemented with fewer transistors and reduced power consumption as compared to the design of FIG. 7. Replacing the op-amp with a capacitor eliminates power otherwise consumed by the op-amp. The slicer 44 can be implemented such that current is only used when switching or making a decision. The charge DAC (qDAC) 46 can be duty cycled to reduce power consumption, especially for low light conditions (low photo current), but still has to cancel out the total photo current to keep the SDM feedback loop working. It is also possible to clamp the photodiode 43 (duty cycled) by additional transistors such that part of the photo current gets dumped. Doing so may reduce the current consumption in extremely high illumination conditions.

It should also be appreciated that if the photodiode 43 is operated at near zero volts, the dark current will be extremely small. Conventional CMOS image sensors reset the reverse diode voltage to a fixed value, to at least 2 to 3 volts at the beginning of the frame. The photo current reduces this voltage and the diode voltage drop is measured at the end of the frame time. This incurs a lot of noise in a dark part of the image where the voltage drop is small.

At very high illumination conditions, it is acceptable to increase the voltage (reverse bias) since the dark current will be relatively small compared to the photo current. This provides a wider linear range before diode saturation, therefore a high dynamic range A small diode voltage fluctuation may occur and is acceptable, since the photo current is extremely linear to illumination, and not affected by the diode voltage, unless the illumination level is extremely high. This is one of the key advantages of charge-based sensing, rather than voltage-based sensing of current CMOS sensors. In a real implementation in CMOS, the photodiode capacitance might be sufficiently high relative to rest of the circuit elements, and the C1 integrator capacitor may not be needed.

Figure 9:
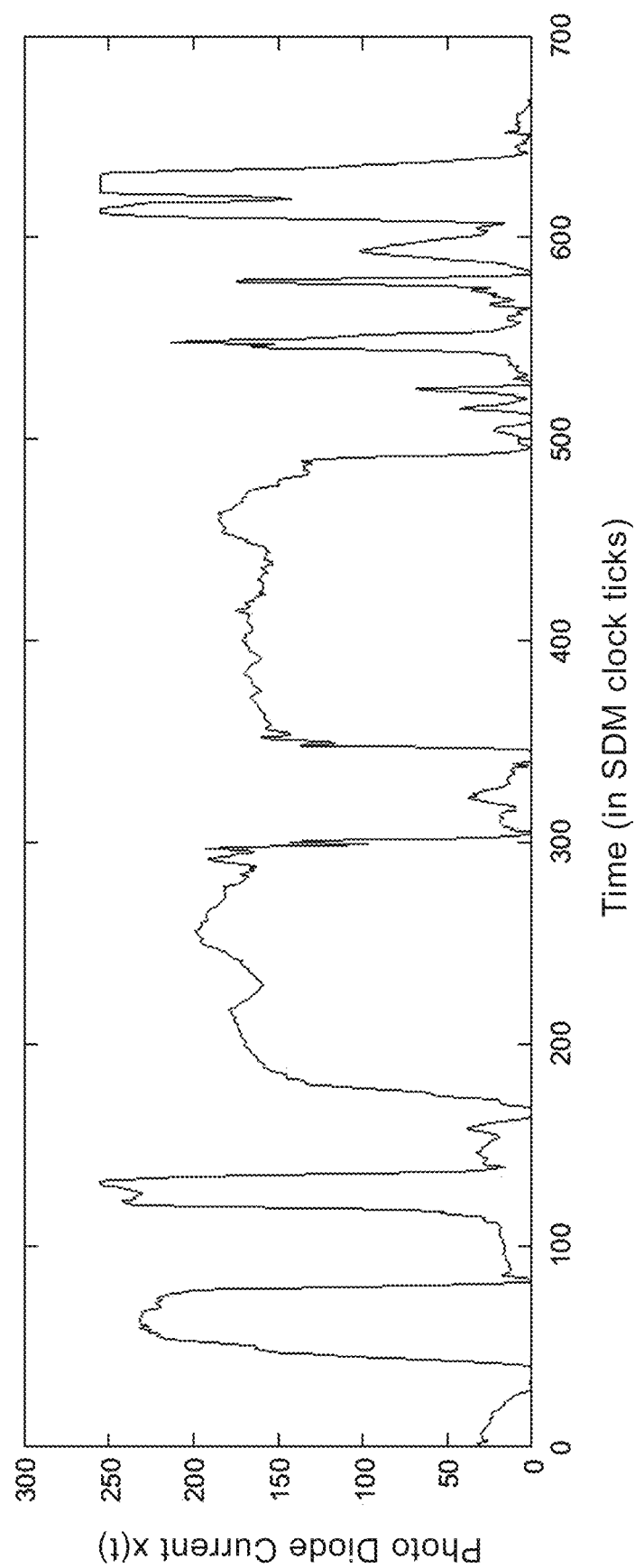
FIGS. 9-11 show example plots of operation of a single frame free video pixel in accordance with the present invention.
Figure 10:
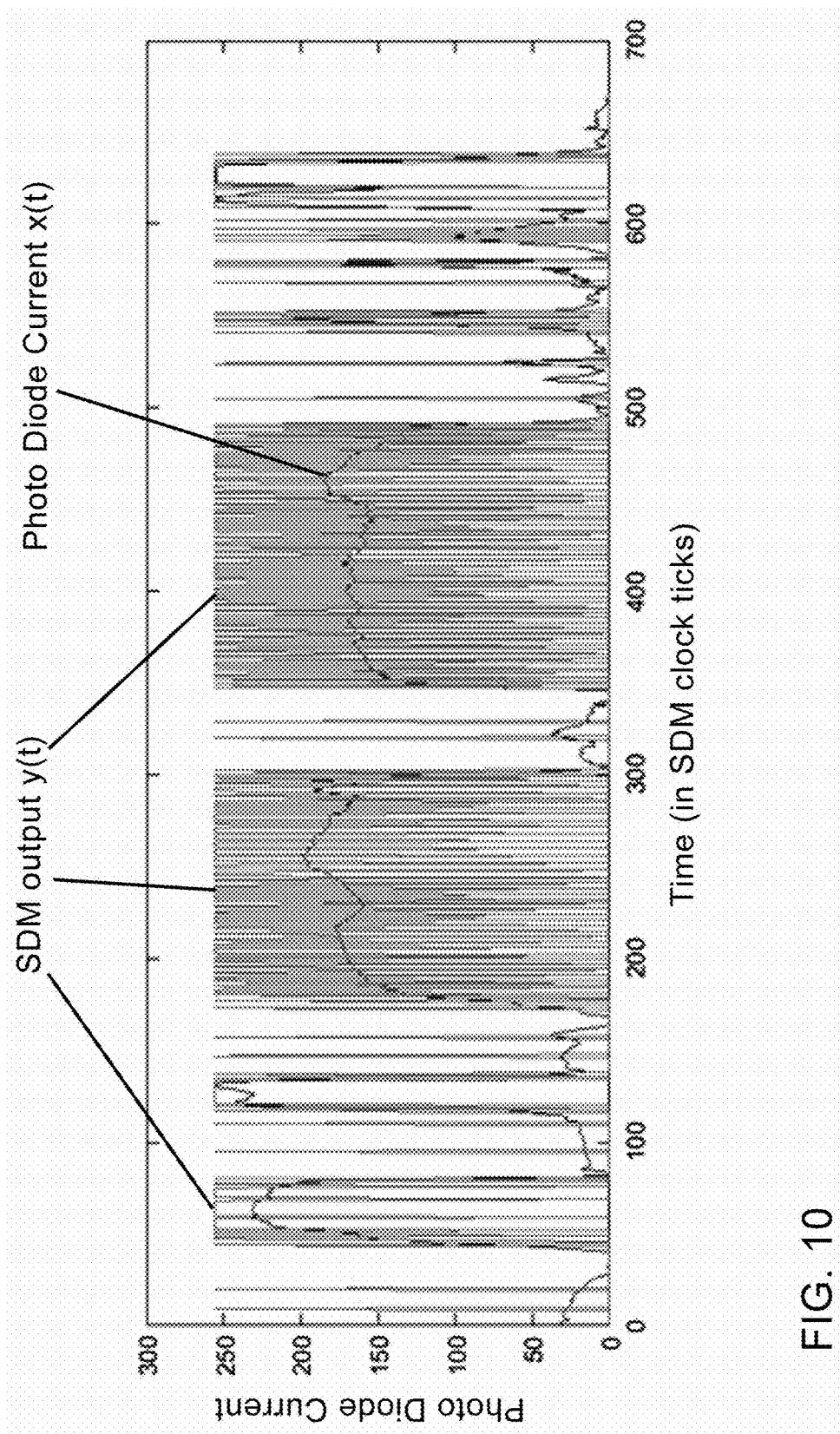
Figure 11:
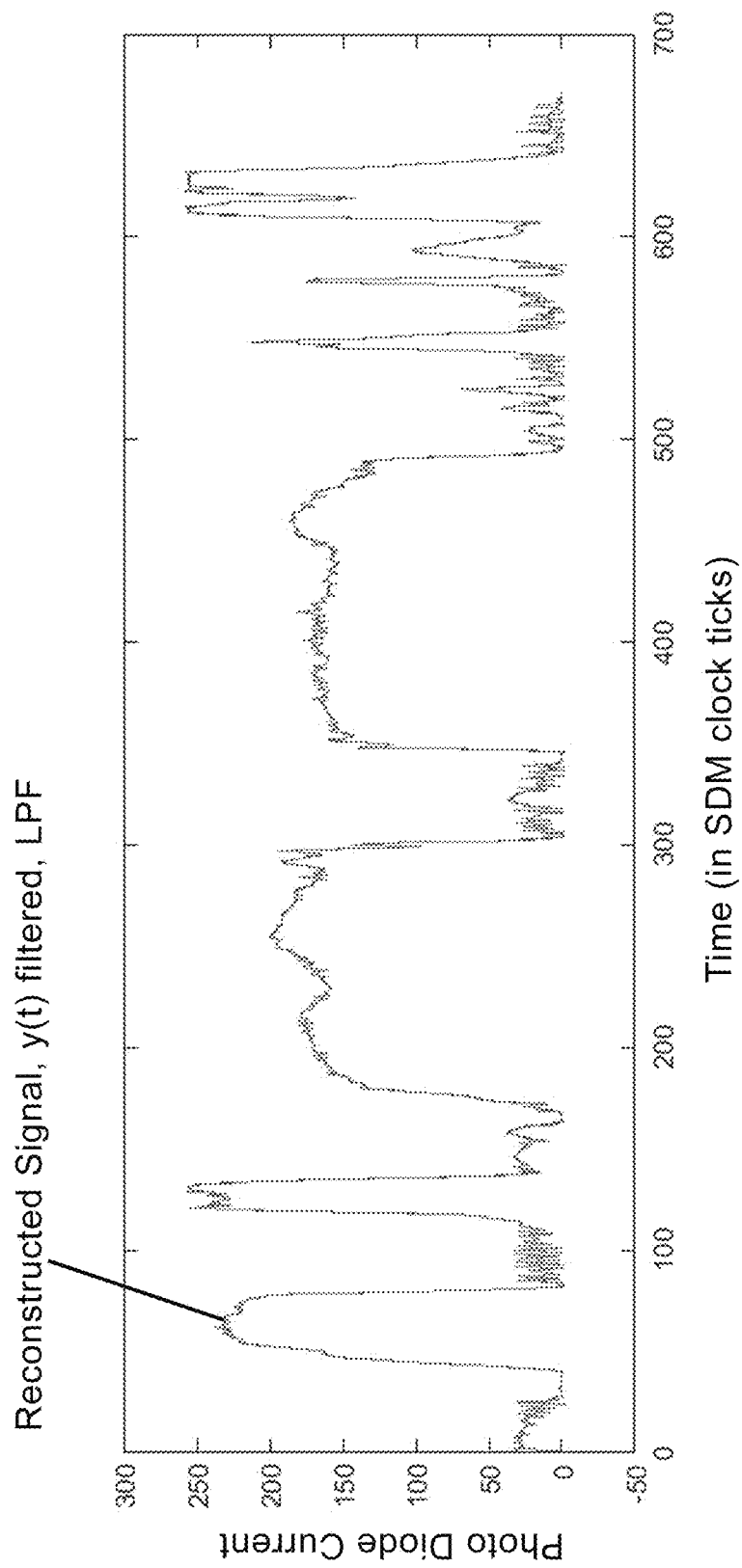

The plots at FIGS. 9-11 show an example of a single FFV pixel operation. FIG. 9 shows a simulated photo current into the photodiode, x(t), plotted against time in clock cycles. Each value represents a brightness at that pixel location at that time instance.

FIG. 10 shows the FFV pixel SDM output y(t) at the oversampling ratio (OSR) of 1× as an overlay on top of the FFV photodiode current of FIG. 9. The signal z(n) is the discrete version of the signal y(t). The SDM output y(t) is binary valued. $I_{max}$=255. In this plot, either y(t)=255 (z(n)=1) or y(t)=0 (z(n)=0).

FIG. 11 shows the reconstruction from the FFV pixel SDM output y(t) for an oversampling ratio (OSR) of 8×. The clock rate has increase by 8×, generated 8× more data, which was filtered and decimated by 8× to match the input time scale. Most of the reconstruction noise is in the high frequency, which improves as OSR increases.

Figure 12:
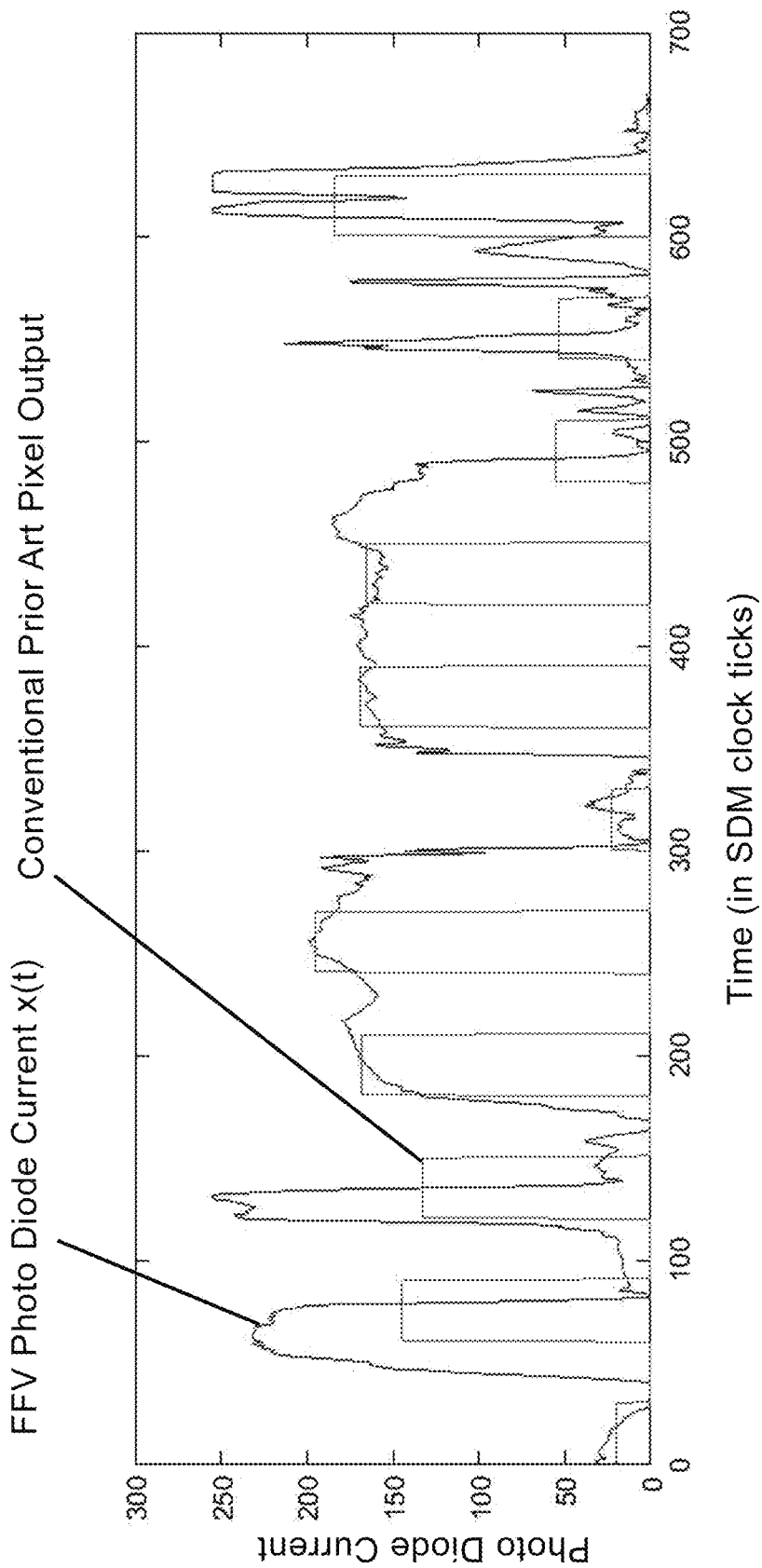
FIG. 12 shows an example of output from a prior art conventional pixel.

FIG. 12 shows a simulation of an output of a conventional (prior art) imaging pixel with a shutter opening at 50% duty cycle as an overlay on top of the FFV photodiode current of FIG. 9. Notice that the output values do not always track the input because of the frame boundary and short shutter duration. In this example, a low frame rate was chosen for easier illustration.

Figure 13:
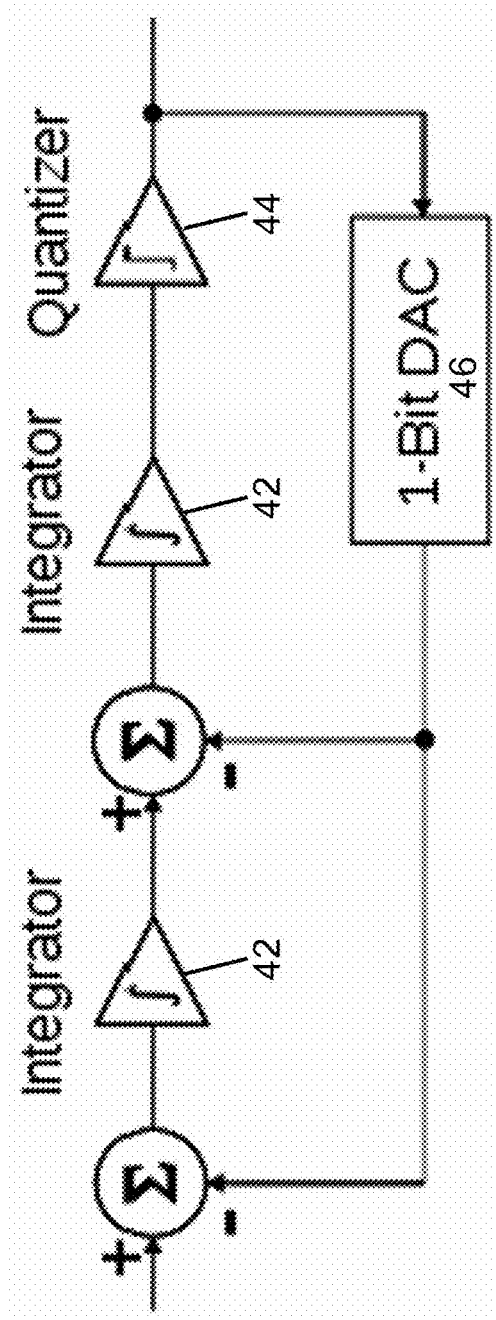
FIG. 13 shows an example of a prior art second order continuous time sigma delta modulator which may be used in an example embodiment of the present invention.

FIG. 13 shows a prior art of a second order sigma delta modulator that can be utilized in the pixel circuitry of the present invention. In the FIG. 13 embodiment, two integrator circuits 42 are arranged in series with the DAC 46 in a feedback loop which feeds into the input of the first integrator 42 and the input of the second integrator 42. The second order SDM typically provides an improved signal-to-noise ratio (SNR) for the same OSR compared to a first order SDM circuit, or a similar SNR for a reduced OSR compared to the first order SDM. A disadvantage with the second order SDM is a reduced dynamic range in order to prevent loop instability and a higher circuit complexity. An alternative would be to have a first order SDM modulator at the pixel and implement a re-modulation elsewhere, to convert it to second order or higher order SDM.

Those skilled in the art will appreciate that present invention can be implemented with higher order SDMs as well.

Figure 14:
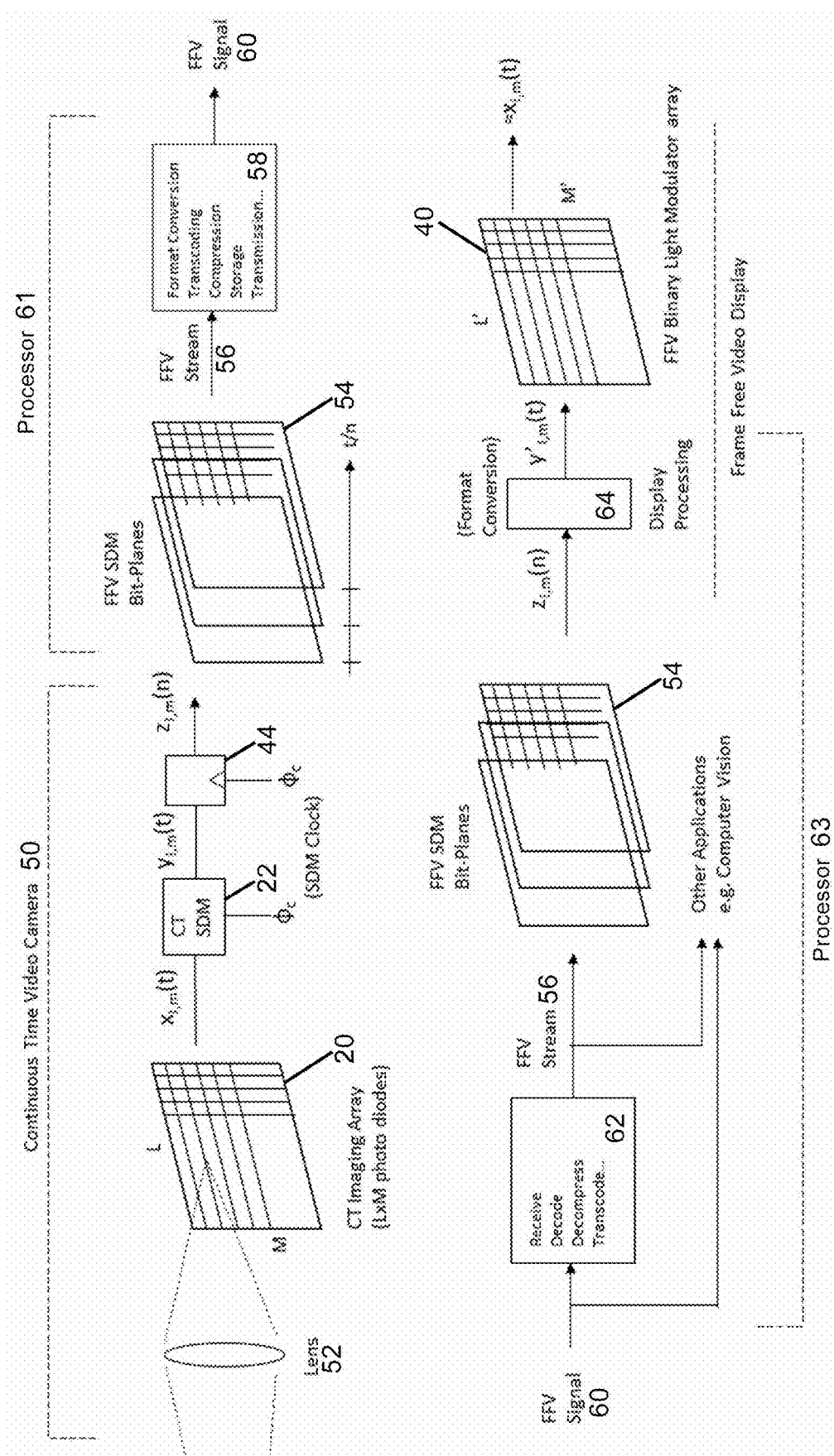
FIG. 14 shows an example embodiment of a frame free video system in accordance with the present invention.

FIG. 14 shows an example embodiment of end-to-end frame free video system in accordance with an example embodiment of the present invention. A continuous time video (CTV) camera 50 may comprise a lens 52 and a continuous time imaging sensor array 20 comprising L×M pixels, for continuously capturing photons incident on pixels of the imaging array to produce respective continuous time analog signals without any discontinuity in time. Each of the pixels of the imaging array 20 may comprise a photodiode and a modulator circuit (as discussed above) for modulating the respective continuous time analog signal into respective continuous time binary analog signal. A processor 61 may be provided for aggregating the continuous time binary analog signals from all the pixels to produce a frame free video stream. A continuous time display array 40 for displaying the frame free video stream may comprise an L'×M' array of light modulators. Each light modulator may be responsive to the SDM digital output of the corresponding pixel in the imaging array.

As discussed in detail above, for each pixel, the incident photon is integrated and converted to photo electric current x(t) continuously in time without photodiode reset or interruption. The SDM 22 converts the variation of the photo electric current at each pixel into a continuous time binary analog signal y(t) by continuous time sigma delta modulation. The continuous time binary analog signal is converted into a discrete time binary digital signal z(n) by the slicer 44. The discrete time binary digital signals z(n) output from all pixels in the imaging array 20 can be aggregated into SDM bit-planes 54. A frame free video stream 56 comprising a time series of SDM bit-planes can then be produced. The frame free video stream 56 can then be subjected to various processing 58 (e.g., at processor 61 or other hardware and/or software components) to produce a frame free video signal 60. Such processing may include, but not be limited to, at least one of manipulating, format converting, encoding, transcoding, compressing, storing, transmitting, and otherwise representing the frame free video stream.

The frame free video signal 60 may then be transmitted, received, and subsequently processed 62 (e.g., decoded, decompressed, stored, transcoded, format converted or otherwise processed) to convert the frame free video signal 60 back into frame free video stream 56 (e.g., at processor 63 or other hardware and/or software components). The frame free video stream 56 may be converted back into SDM bit-planes 54 that can be subjected to display processing and format conversion 64 (e.g., at processor 63 or other hardware and/or software components), for display via the display array 40 that comprises L'×M' binary light modulators. The format conversion may include changing the resolution of the original frame free video stream from L×M to L'×M' that corresponds to the display resolution. Further format conversion may include changing the SDM clock rate.

Those skilled in the art will appreciate that various functionalities of the system may be carried out by one or more processors running on one or more computer devices. For example, the discrete time binary digital signals from all of the pixels in the imaging array may be aggregated by a processor to produce a corresponding binary bit-plane per each clock cycle of the sigma delta modulator to convert the frame free video to a frame free video stream. Encoders, transcoders, and other processing devices and/or software programs may be used for the various processing of the frame free video stream into a frame free video signal and vice versa.

With the present invention, the pixel circuit integrates incident photons continuously in time, without reset. Thus, there is no loss of photons, and no time aliasing. The pixel value corresponds to the number of photons integrated over unit time. The unit time corresponds to the SDM clock period. The SDM modulated output is a continuous time analog signal, its amplitude is quantized to binary values and the amplitude is constant during each SDM clock period. The SDM discrete time output maps those levels to 1's and 0's (binary). For example, a 2 volt level can be coded to a binary 1, and a 0 volt level can be coded to binary 0. The SDM bit-plane is an L×M collection of the discrete SDM output from each pixel. Each SDM bit-plane is produced for each SDM clock. The frame free video stream is the raw data out of the L×M imaging array, equivalent to a series of SDM bit-planes (L×M bits per bit-plane, every clock cycle).

The frame free video signal is an alternative representation of the frame free video stream (e.g., a compressed version of frame free video stream). Format conversion of the frame free video stream includes changing the dimension of the SDM bit-plane (to L'×M') or changing the SDM clock rate for the bit-planes. The binary light modulator at the display 40 reproduces the continuous time analog signal of each SDM pixel, y(t). When the light modulator update rate (SDM clock rate) is fast enough, human eye sees the average brightness and the video is reconstructed in the eye.

The binary 1's and 0's from the discrete time binary digital signal may be mapped to a maximum value and a minimum value, respectively, to enable continuous time video processing or display.

Those skilled in the art will appreciate that the frame free video signal may be used for other than display purposes. For example, such purposes may include but not be limited to artificial intelligence, computer vision, autonomous driving, drones (e.g., where the video information is not for human visual consumption). Because of the nature of alias free, continuous time representation of frame free video, the content is easier to analyze mathematically, especially with respect to motion. Thus, capture and transport of frame free video (as described above) with computer vision analysis is possible, instead of or in addition to the display of the video.

In another aspect of the present invention, frame-based video (e.g., video captured by a conventional camera or previously recorded or stored frame-based video, such as 24 frame-per-second film or 60 Hz video) can be transcoded into frame free video for display on a frame free display. Such a transcoding method would be advantageous in the event a frame free video camera and/or transmission system has not been developed or is not available.

Figure 15:
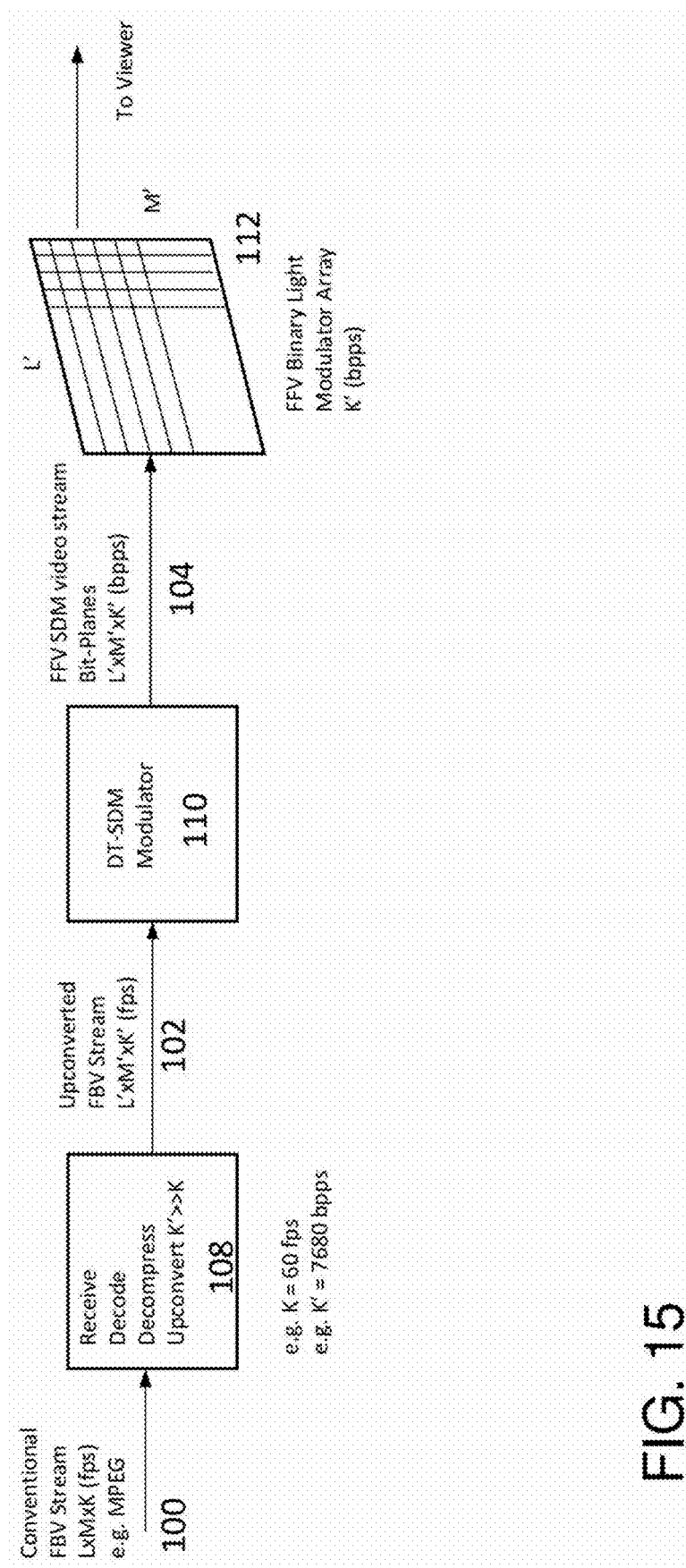
FIG. 15 shows an example embodiment of a system for converting a frame-based video stream into a frame free video stream in accordance with the present invention.

In accordance with one example embodiment of the present invention, a method of transcoding frame-based video to frame free video is provided. As shown in FIG. 15, the method comprises receiving a frame-based video stream 100 (e.g., an MPEG stream or the like), upconverting the received frame-based video stream to produce an upconverted frame-based video stream 102 at a higher frame rate than the received frame-based video stream, and modulating the upconverted frame-based video stream using discrete time sigma delta modulation to produce a frame free video stream 104. The frame-based video stream 100 may be received at a receiver/transcoder/upconverter 108 which is enabled to decode, decompress and/or upconvert the frame-based video stream as needed to produce the upconverted frame-based video stream 102. A discrete time sigma delta modulator 110 may be provided for modulating the upconverted frame-based video stream using discrete time sigma delta modulation to produce the frame free video stream 104 for display on a frame free video display 112.

The received frame-based video stream 100 may be an uncompressed stream. Alternatively, the received frame-based video stream may be a compressed video stream. In such an instance, the compressed video stream may be decompressed (e.g., at receiver/transcoder/upconverter 108) to provide a decompressed frame-based video stream. The decompressed frame-based video stream may then be upconverted to produce the upconverted frame-based video stream 102 as discussed above.

Figure 16:
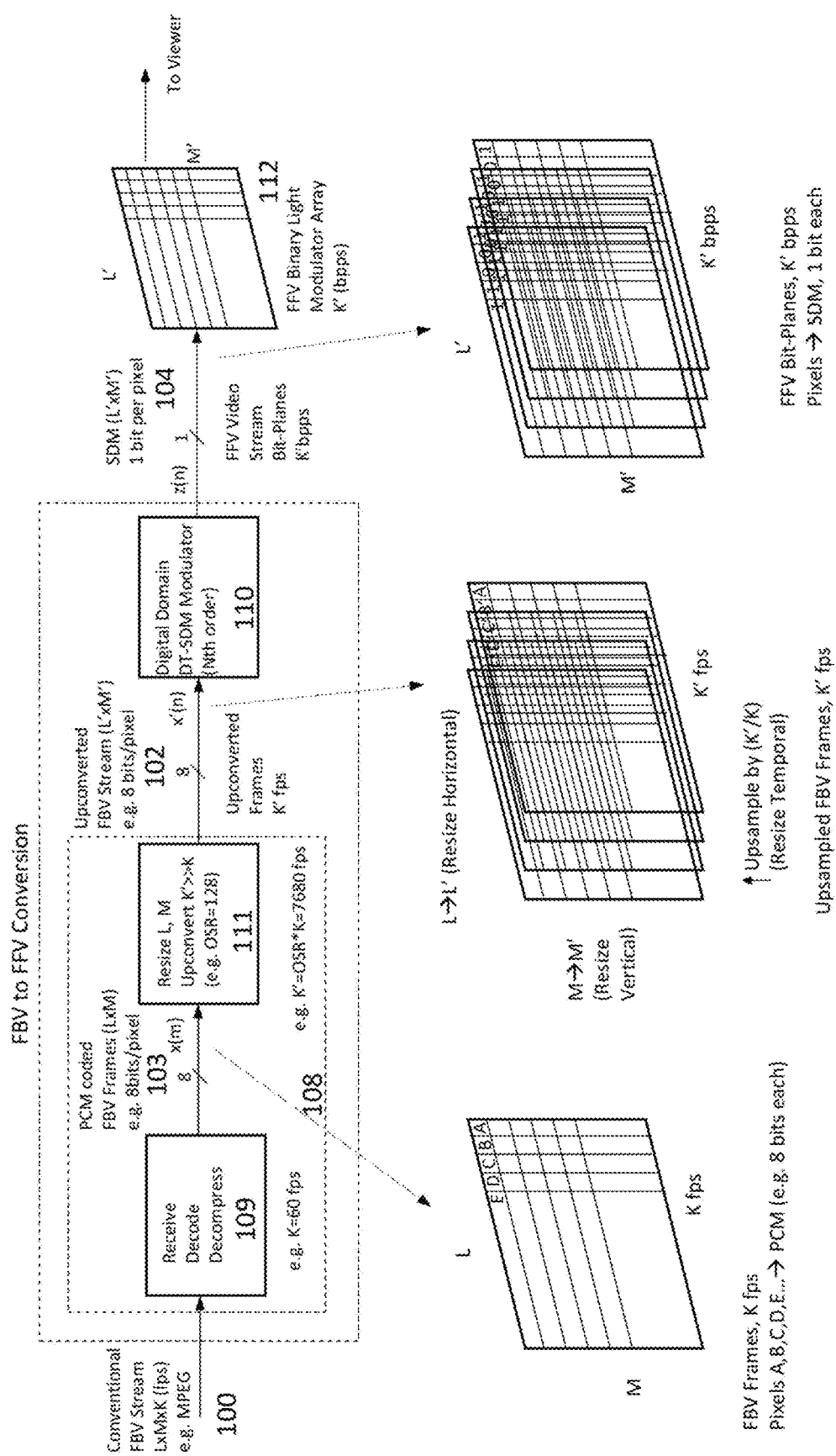
FIG. 16 shows a further example embodiment of a system for converting a frame-based video stream into a frame free video stream in accordance with the present invention.

FIG. 16 shows a more detailed block diagram illustrating the transcoding of the frame-based video stream 100 into a frame free video stream 104. In FIG. 16 the receiver/transcoder/upconverter 108 is shown as being comprised of a receiver/transcoder 109 and an upconverter 111. The method may further comprise deriving motion parameters from the received frame-based video stream, and interpolating the received frame-based video stream prior during the upconversion process and prior to the modulating of the upconverted frame-based video stream using the derived motion parameters. Motion adaptive frame interpolation may be used to smoothly fill in the missing frames by estimating the location of the object or pixels based on the motion parameters. The discrete time sigma delta modulator 110 converts the multi-bit PCM frames to 1-bit SDM bit planes. The resulting frame free video stream 104 will have higher temporal bandwidth, by artificially interpolating the missing frame-based video frames, thereby increasing the frame free video bit plane rate (The discrete time sigma delta modulator 110 generates one output bit plane from each input frame).

Motion adaptive frame interpolation can be assisted by Artificial Intelligence (AI) or Machine Learning (ML) techniques to reduce the chances of making interpolation errors. This transcoding from frame-based vide to frame free video increases the frame free bit plane rate by OSR (Over Sampling Ratio) from the frame-based video frame rate. One input frame-based video frame produces OSR number of frame free video bit planes.

As shown in FIG. 16, a stream 103 of frames (L×M) with PCM pixel values (e.g., A, B, C, D, E . . . each at 8 bits) output from the receiver/transcoder 109 are upconverted at upconverter 111 to a much higher frame rate, optionally at different spatial resolution (L'×M'). The temporal upconversion process increases the frame rate from K to K' (K'=OSR*K, with Over Sampling Ratio OSR), resulting in an oversampled PCM signal. Temporal upconversion can utilize motion compensation or optical flow techniques, and optionally may be AI or machine learning assisted. A digital domain sigma delta modulator 110 is applied to convert the oversampled PCM signal 102 into frame free SDM signal 104.

Figure 17:
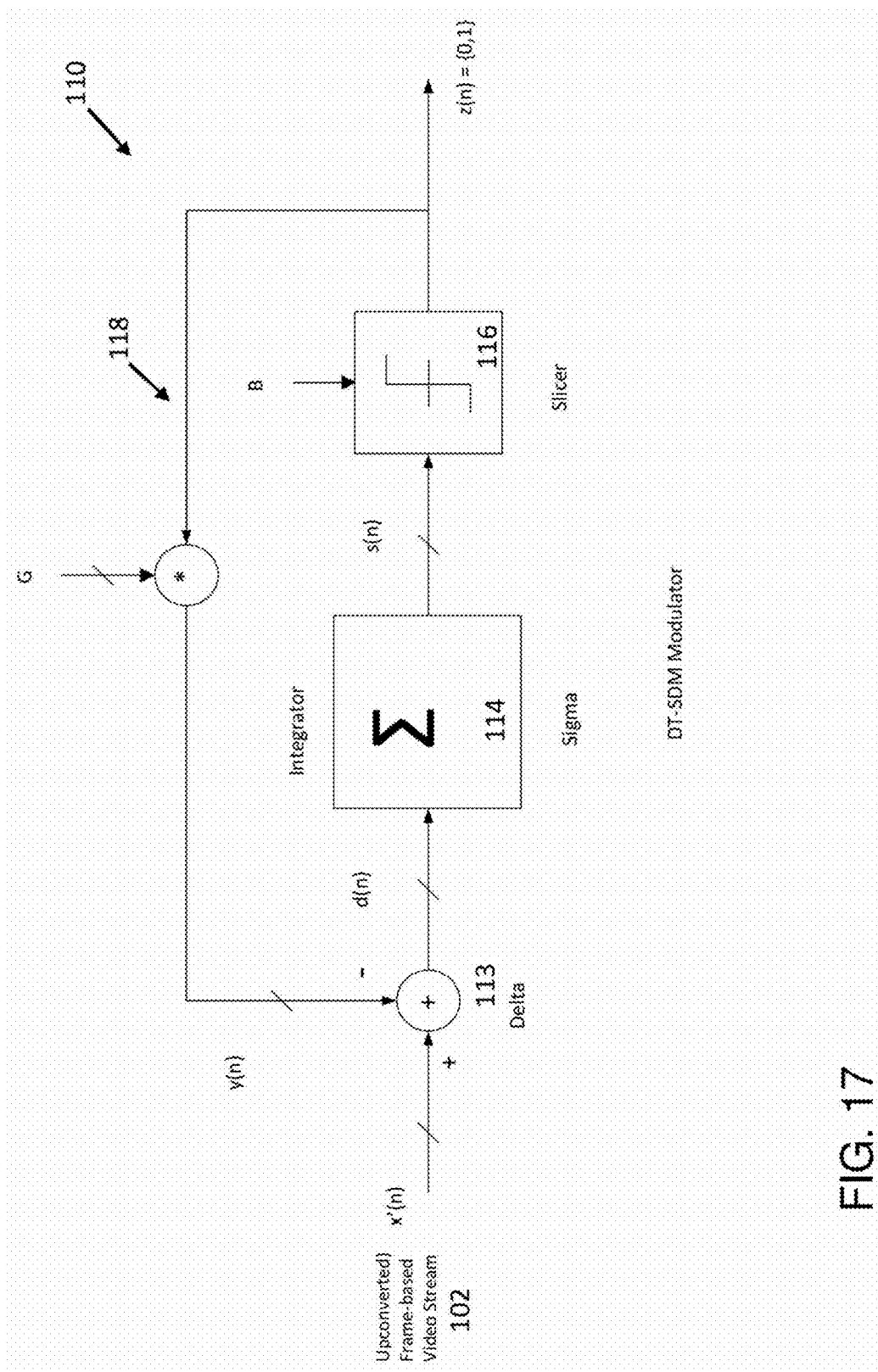
FIG. 17 shows an example embodiment of a discrete time sigma delta modulator in accordance with the present invention.

FIG. 17 shows an example embodiment of a discrete time sigma delta modulator 110 in accordance with the present invention. In the example embodiment shown in FIG. 17, each pixel value x'(n) in the upconverted frame-based video stream 102 is integrated continuously by a digital integrator 114 to produce an integrated value s(n) which represents the total cumulative pixel value over time. Each time the integrated value s(n) exceeds a threshold value, a fixed value is subtracted from the integrated value to keep the remaining integrated value within an operating range. The series of subtracted values over time results in a close approximation of the total integrated value, enabling the sigma delta modulator to produce a discrete time binary digital signal.

As shown in FIG. 17, the sigma delta modulator 110 may comprise the digital integrator 114, a slicer 116 coupled to the output of the integrator 114 for determining whether the integrated value s(n) from the integrator output exceeds the threshold value, the slicer output comprising discrete time binary digital signals, and a feedback gain loop 118 coupled to an output of the slicer 116 and the input of the digital integrator 114 which produces the fixed value to be subtracted from the input x'(n) each time the integrated value exceeds a threshold value, enabling the digital integrator 114 to operate within an operating range.

In FIG. 17, the input signal x'(n) represents an N-bit PCM value of each pixel in an oversampled FBV frame (where all L'×M' pixels are processed independently of each other). The signal z(n) represents a binary decision of the slicer 116 (i.e., either 0 or 1), at every clock cycle (SDM modulation rate). The signal y(n) is the feedback gain signal derived from the signal z(n) multiplied by feedback gain G (G is typically determined by the maximum value of the PCM input). A delta operation 113 subtracts the feedback signal y(n) from the input x'(n) to obtain a new integrator input d(n) for each successive pixel being processed such that d(n)=x'(n)−y(n). The integrator 114 includes a sigma operation which accumulates the delta operation input to produce the integrated value s(n) such that s(n)=d(n)+s(n−1). The slicer 116 compares s(n) against a threshold (e.g., a slicer bias of value B) to produce a binary output z(n) (i.e., z(n)=0 if s(n)<B, z(n)=1 if s(n)>=B).

It should be appreciated that a higher order (Nth order) SDM modulation is possible, and can improve the signal to noise ratio. This is because a higher order SDM can achieve a better noise shaping, by pushing the noise to higher frequency and improving the SNR in the lower frequency. This is beneficial since the viewer sees mostly the low frequency and not the high frequency noise.

The received frame-based video stream 100 may have a frame rate of K. The upconverted frame-based video stream 102 may have a frame rate of K'=OSR*K. The resulting frame free video stream 104 will then have a bit plane rate of K'=OSR*K.

Figure 18:
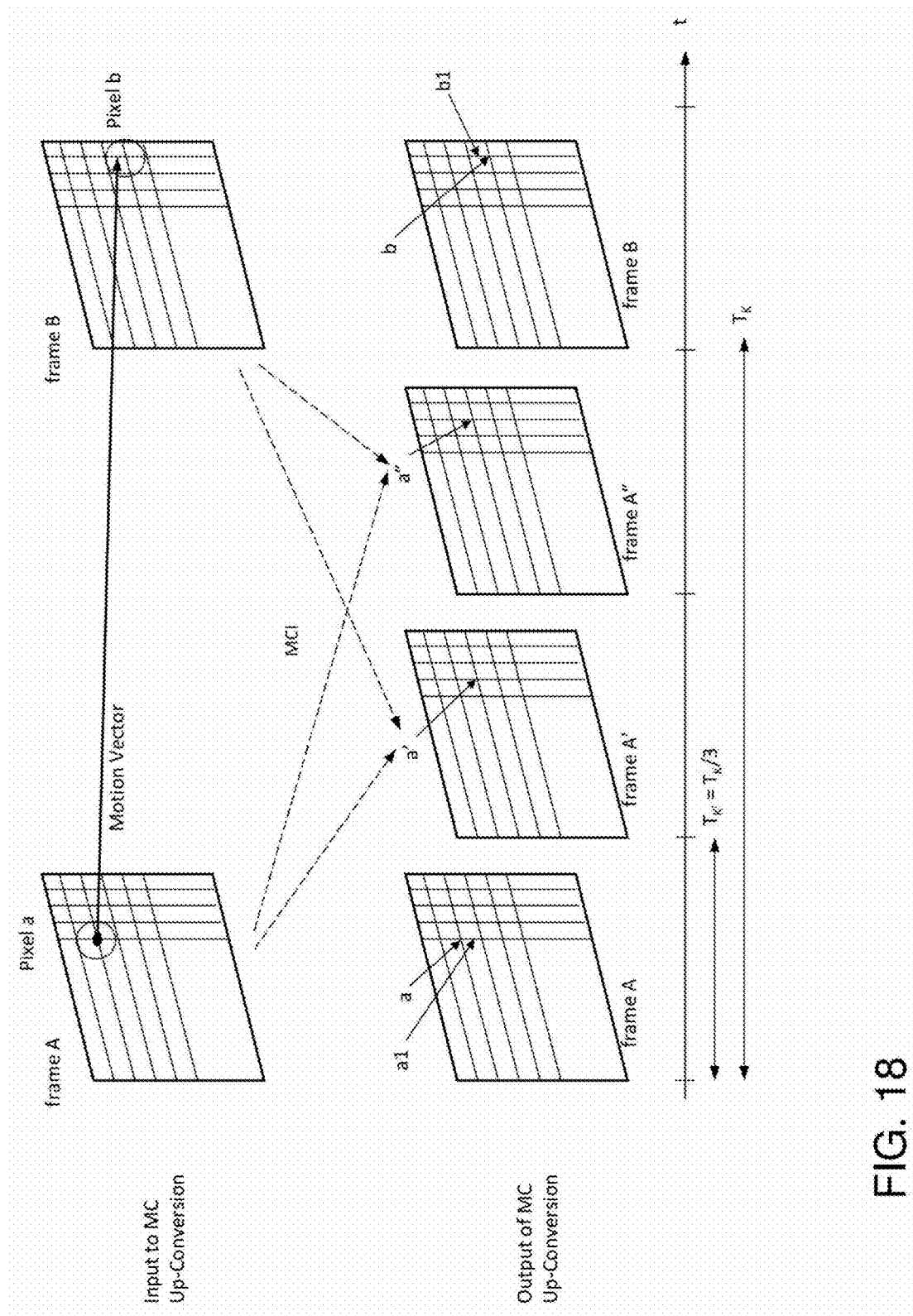
FIG. 18 shows an example embodiment of a motion estimation process in accordance with the present invention.

FIG. 18 illustrates an example embodiment of an upconversion process carried out on motion compensated video frames in accordance with the present invention. There are 2 anchor frames, A and B, separated in time by $T_K$, which are input to the up-conversion process. The goal is to compute additional frames between frames A and B. In this example, frame A' and frame A", separated in time by $T_{K'}$, from frames A and B. A motion vector is estimated (as is known from the prior art) that shows the trajectory of a pixel "a" in frame A to a pixel "b" frame B. However, the destination pixel may not map directly onto the sampling grid, but rather may land in between two sampling points. In such a case, a spatial interpolation within frame A or within frame B may be required to obtain pixel values a1 or b1 in this example. A temporal interpolation is required to compute pixel a' in frame A' and pixel a" in frame A". Motion compensated interpolation (MCI) uses the motion vector to compute a' and a" more accurately. Pixel a', which is on a grid point in frame A', is computed by averaging (filtering) pixel a1 and pixel b. Pixel a" which is on a grid point in frame A" is computed by averaging (filtering) pixel a and pixel b1. A more accurate result can be obtained if a weighted average is taken (as is known from the prior art). For example, the estimate can be obtained from various metrics, such as Sum of Overlapped Area Average Difference (SOAD): a'=α'*a1+(1−α')*b, a"=α"*a+(1−α")*b1, where α is the weighted index found by SOAD technique. This linear filtering can be extended to more than 2 frames if desired. All pixels in frame A' may be computed with a different motion vector and a' at each pixel. All pixels in frame A" may be computed with a different motion vector and a" at each pixel.

Figure 19:
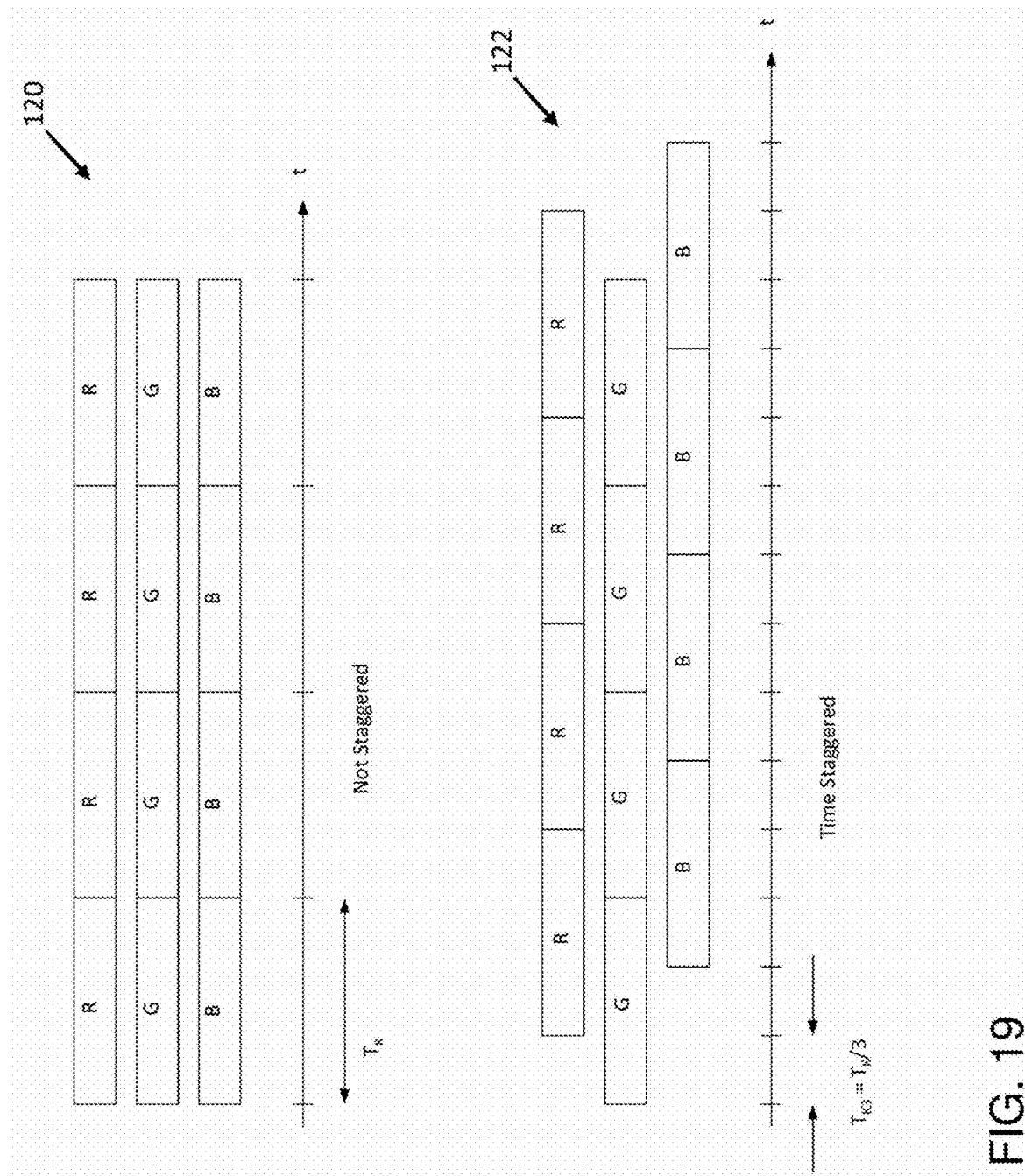
FIG. 19 shows an example embodiment of time staggering of red, green, and blue color channels in accordance with the present invention.

The method may further comprise displaying the frame free video stream on a frame free video display 112, as shown in FIGS. 15 and 16. The frame free video display 112 may modulate the light at each pixel in the display in a binary on/off manner. The frame free video stream 104 may comprise multiple color channels, such as red, green, and blue color channels (or more). The display of each channel may be respectively staggered at a predetermined interval (e.g., a bit plane interval divided by the number of color channels). For example, in the case of red, green and blue color channels, the interval may comprise one third of a bit plane interval. FIG. 19 illustrates the concept of time staggering the red, green and blue color channels. A typical color channel 120 is shown without staggering. A staggered color channel 122 is shown with the predetermined interval comprising ⅓ of a bit plane. Staggering the display of the color channels will increase the effective flicker rate and reduce visible noise.

Figure 20:
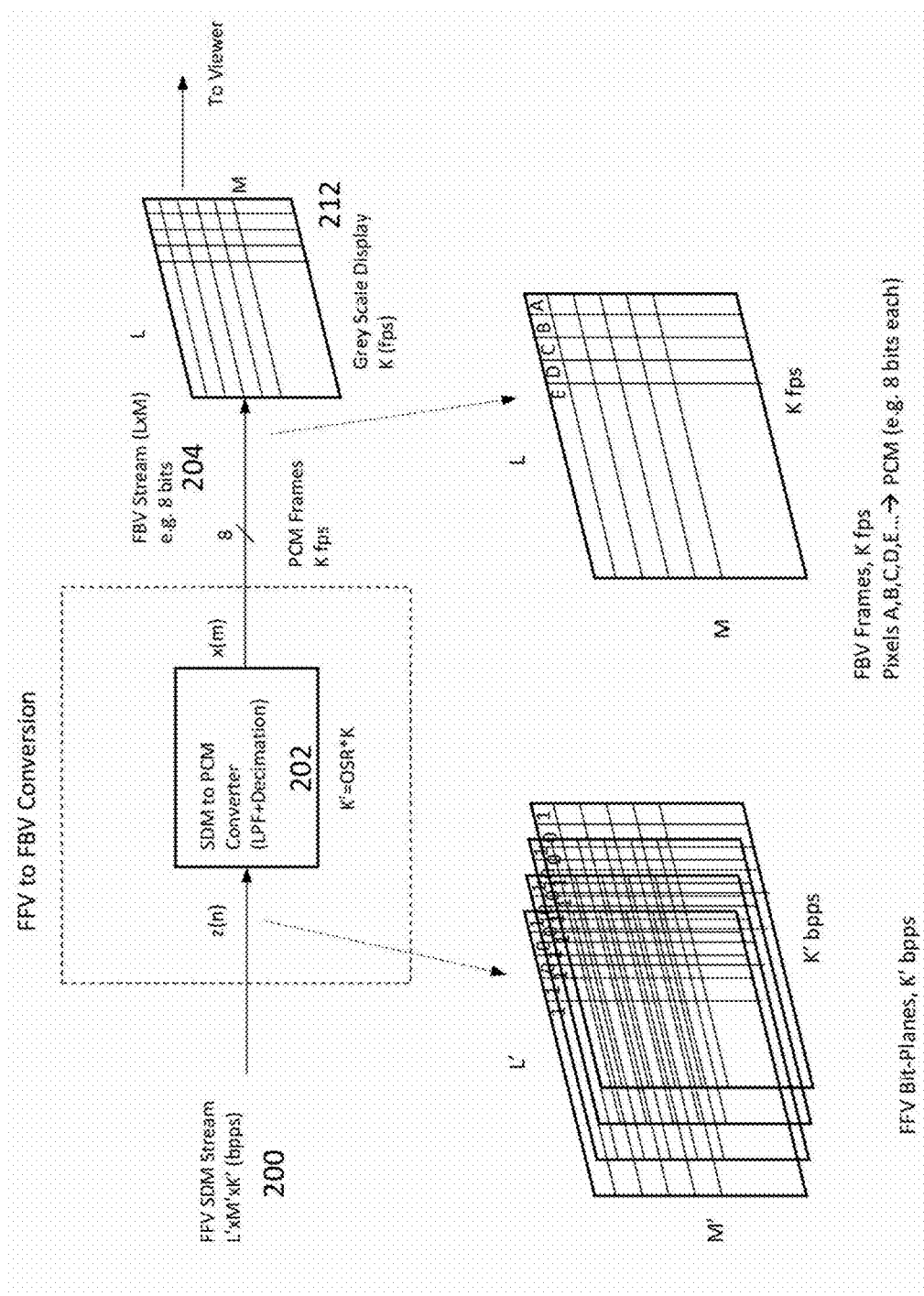
FIG. 20 shows an example embodiment of a system for converting a frame free video stream into a frame-based video stream in accordance with the present invention.

The present invention further encompasses a method of transcoding frame free video to frame-based video, an example embodiment of which is illustrated in FIG. 20. A frame free video stream 200 is received at a bit plane rate of K'=OSR*K (e.g., at a receiver/transcoder 202). The frame free video stream 200 is decimated by the OSR to produce a frame-based video stream 204 at a frame rate of K. The frame-based video stream 204 may then be displayed on a conventional frame-based video display 212.

The decimating may comprise low pass filtering and subsampling at the receiver/transcoder 202 that results in multiple bits per pixel value. The decimating may also comprise motion adaptive decimation. The motion adaptive decimation may be augmented by one of artificial intelligence or machine learning techniques. The method may further comprise deriving motion parameters from the frame free video stream and utilizing the motion parameters in the decimating process.

As shown in FIG. 20, the frame free video stream 200 may comprise a stream of bit-planes (e.g., with L'×M' spatial resolution at K' bpps) with binary values. The bit-planes are downconverted to a much lower frame rate of K fps, possibly at a different spatial resolution, L×M. The resulting frame-based video stream 204 has grey scale values e.g., PCM coded 8 bits per pixel (e.g., pixels A, B, C, D, E . . . ). The temporal downconversion decreases the frame rate from K' to K (K=K'/D, with Downconversion factor D=OSR) to provide a conventional PCM coded frame-based video stream 204. The temporal downconversion may utilize motion compensation or optical flow techniques, which can be optionally AI or machine learning assisted. A digital domain low pass filter (LPF) may be applied to convert the oversampled frame free video signal 200 into frame-based video signal 204 signal suitable for conventional grey scale displays.

Figure 21:
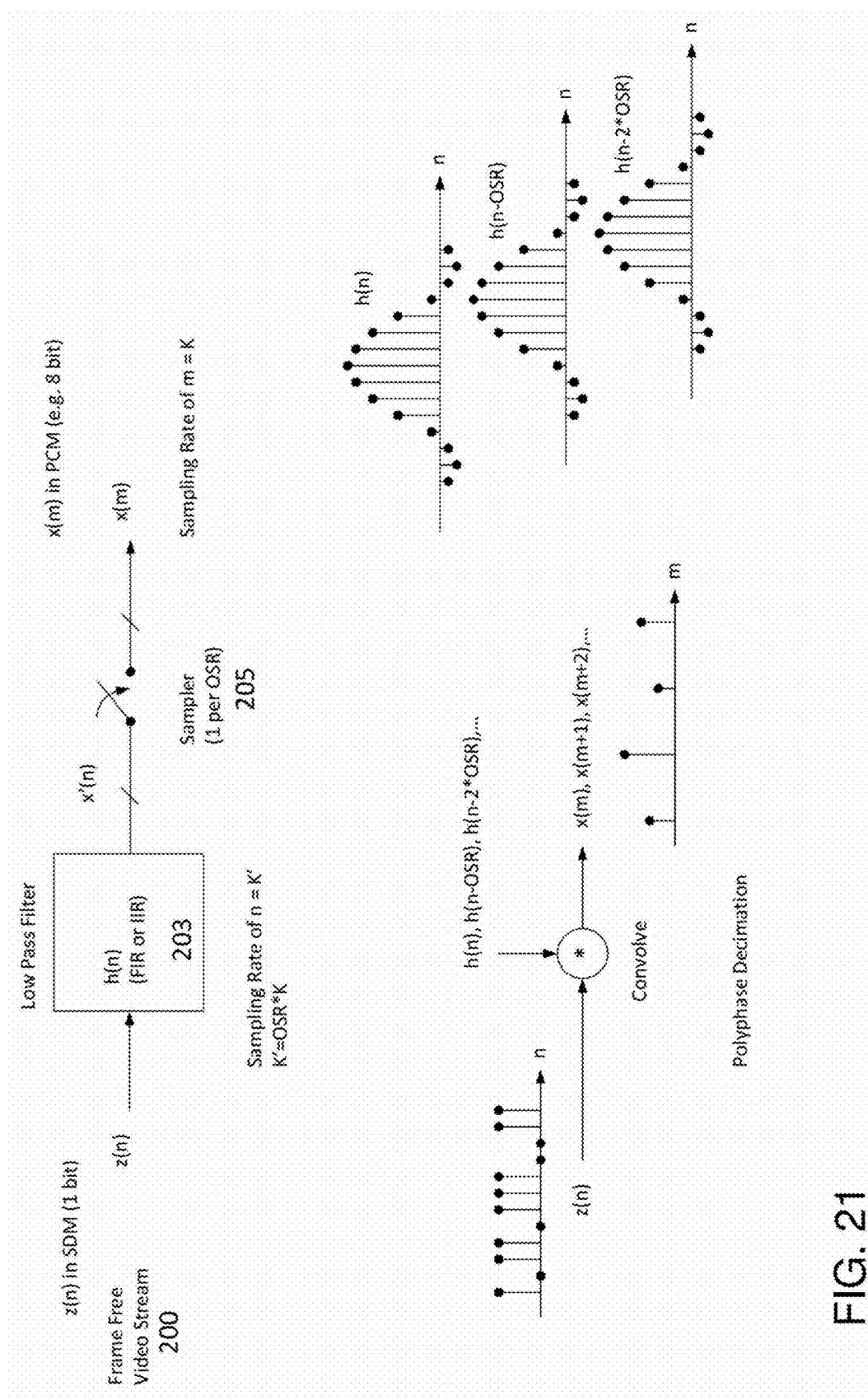
FIG. 21 shows an example embodiment of a down conversion or decimation process used to convert frame free video into frame-based video in accordance with the present invention.

FIG. 21 illustrates an example of a down conversion or decimation process used to convert frame free video into frame-based video. Each pixel in the frame free video stream 200, denoted by z(n) is processed independently by a low pass filter h(n) 203 to produce x'(n) LPF[z(n)]. The signal x'(n) represents the low pass filtered z(n) across an interval, which interval typically spans more than OSR samples. The signal x'(n) is then subsampled at sampler 205 to produce x(m), a subsampled (decimation) version of x'(n), with subsampling factor of OSR. Typically, the signal z(n) is 1 bit and x'(n) is multi-bit (e.g. 8 bit PCM).

A computational shortcut such as a Polyphase Decimation filter may be used. The low pass filter 203 may comprise an infinite impulse response (IIR) low pass filter or a finite impulse response (FIR) low pass filter. The OSR may be the same or different from the OSR used in PCM to SDM Converter discussed above.

Figure 22:
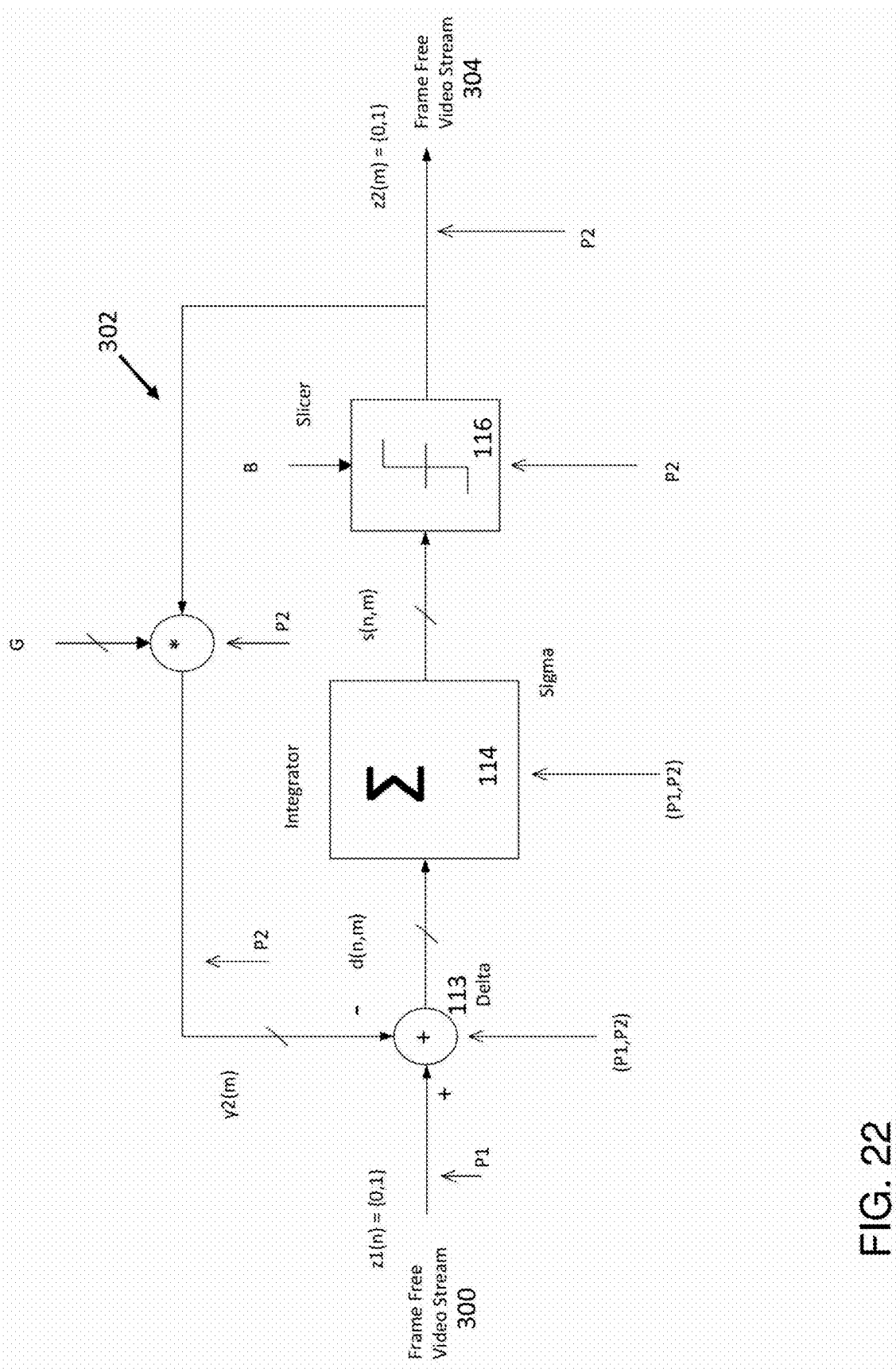
FIG. 22 shows an example embodiment of a system for transcoding frame free video from one bit plane rate to a different bit plane rate in accordance with the present invention.

In a further aspect of the invention, a method for transcoding frame free video from a first bit plane rate to a second bit plane rate is provided. As shown in FIG. 22, a frame free video stream 300 with a first bit plane rate is remodulated to produce a remodulated frame free video stream 304 at a second bit plane rate. The frame free video stream 300 may be produced by a first sigma delta modulator (see, e.g., FIG. 17 as described above) operating at a first clock frequency and the remodulating is carried out by a second sigma delta modulator 302 operating at a second clock frequency to produce the remodulated frame free video stream 304.

The sigma delta modulator 302 may comprise a delta operation 113, an integrator 114, and a slicer 116 which function similarly to the corresponding components of FIG. 17 discussed above.

The bit values for each bit plane of the frame free video stream 300 are integrated (e.g., a sigma operation which is equivalent to as summing as the sigma delta modulator is operating in the digital domain) at the integrator 114 at the first bit plane rate (clock P1). The integrated values are compared against a threshold at the slicer 116 to make the binary slicer decision. A fixed value (delta feedback) from the integrator is subtracted at the delta operation 113 according to the slicer decision. The slicer decision is output at the second bit plane rate (clock P2). This updates the integrator by subtracting y2(m)=G*z2(m) at the second bit plane rate (clock P2). Therefore the integrator is updated at both clock P1 and clock P2.

As shown in the FIG. 22 example embodiment, P1 represents the SDM input clock, at the first (input) bit plane rate (BPR1) and P2 represents the SDM output clock, at the second (output) Bit bit plane rate (BPR2). The frame free video signal 300, represented by z1(n) comprises an SDM Bit Plane value {0 or 1} of each pixel at time instance n, clocked by P1. The frame free video signal 304, represented by z2(m) is a result of the slicer 116 decision {0 or 1} at time instance m, clocked by P2. The signal y2(m) is the feedback gain signal derived from the signal z2(m) multiplied by the feedback gain G. The gain G can be adjusted to avoid saturation and control the output gain. The signal d(n,m) is the difference signal derived from the difference between z1(n) and y2(m) at the delta operation 113. The integrator 114 outputs signal s(n, m) which represents an accumulation of the delta operation 113.

It should be appreciated that if BPR1<BPR2 the process is an upconversion process where P1 clocks slower than P2. If BPR1>BPR2 the process is a down conversion process where P1 clocks faster than P2. Clocks P1 and P2 update the sigma and delta operations independently.

More than one integrator 114 may be employed in the sigma delta modulator to provide higher order SDM conversions. In such an embodiment, each integrator receives the feedback value from the slicer 116.

The slicer may comprise a one-bit quantizer. A multi-bit quantizer may also be used.

In the addition, those skilled in the art will appreciate that the present invention can be extended to transcode between frame-based and frame free video for a single still frame or image. A single frame may be input and replicated when transcoding to frame free video. Only the duration of the frame free video output needs to be specified. Conversely a single output frame may be captured when transcoding from frame free video to a frame-based image. In such a case, the time instance of the capture needs to be specified.

For example, the methods for transcoding from frame-based video to frame free video discussed herein can be used to produce a frame free video stream from a single still frame. A single frame of a still picture is replicated as many times as needed to produce a frame free video stream of any desired length. This does not require motion compensated frame up-conversion since the single input frame has no motion and every input frame is the same during the SDM modulation.

Conversely, a frame free video stream can be transcoded to a single still frame. Any desired number of frame free video bit planes can be low pass filtered and decimated to produce the frame based still picture. This still picture can be stored or manipulated in any manner, as a single frame. A replication of this single frame at the required frame rate would produce the frame-based video display, but without any motion. Unlike the transcoding of a still picture into a frame free video stream, the transcoding of a frame free video stream at any time instance can incorporate motion information. Motion compensated frame down-conversion would minimize blurring of moving objects within the single frame. However, this is optional. Sometimes blurring is acceptable or preferred.

It should now be appreciated that the present invention provides advantageous methods, apparatus, and systems for representing video in continuous time, without frame breaks, as well as methods, apparatus and systems for transcoding from frame-based video to frame free video, and vice versa.

Although the invention has been described in connection with various illustrated embodiments, numerous modifications and adaptations may be made thereto without departing from the spirit and scope of the invention as set forth in the claims.

What is claimed is:

1. A method of transcoding frame-based video to frame free video, comprising:
   receiving a frame-based video stream;
   upconverting the received frame-based video stream to produce an upconverted frame-based video stream at a higher frame rate than the received frame-based video stream; and
   modulating the upconverted frame-based video stream using discrete time sigma delta modulation to produce a frame free video stream which comprises a series of bit planes which forms a continuous time video stream without any frame boundaries.

2. The method in accordance with claim 1, wherein the received frame-based video stream is an uncompressed stream.

3. The method in accordance with claim 1, wherein:
   the received frame-based video stream is a compressed video stream;
   the compressed video stream is decompressed to provide a decompressed frame-based video stream;
   the decompressed frame-based video stream is upconverted to produce the upconverted frame-based video stream.

4. The method in accordance with claim 1, further comprising;
   deriving motion parameters from the received frame-based video stream; and
   interpolating the received frame-based video stream prior to the modulating of the upconverted frame-based video stream using the derived motion parameters.

5. The method in accordance with claim 4, wherein the interpolating comprises motion adaptive frame interpolation.

6. The method in accordance with claim 4, wherein the interpolating is augmented by one of artificial intelligence or machine learning techniques.

7. The method in accordance with claim 1, wherein the modulating is carried out using a discrete time sigma delta modulator wherein:
   each pixel value in the upconverted frame-based video stream is integrated continuously by a digital integrator to produce an integrated value which represents the total cumulative pixel value over time;
   each time the integrated value exceeds a threshold value, subtracting a fixed value from the integrated value to keep the remaining integrated value within an operating range;
   the series of subtracted values over time results in a close approximation of the total integrated value, enabling the sigma delta modulator to produce a discrete time binary digital signal.

8. The method in accordance with claim 7, wherein the sigma delta modulator comprises:
   the digital integrator;
   a slicer coupled to the output of the integrator for determining whether the integrated value from the integrator output exceeds the threshold value, the slicer output comprising discrete time binary digital signals; and
   a feedback gain loop coupled to an output of the slicer and the input of the digital integrator which produces the fixed value to be subtracted each time the integrated value exceeds a threshold value, enabling the digital integrator to operate within an operating range.

9. The method in accordance with claim 1, wherein:
   the received frame-based video stream has a frame rate of K;
   the upconverted frame-based video stream has a frame rate of OSR*K; and
   the frame free video stream has a bit plane rate of OSR*K.

10. The method in accordance with claim 1, further comprising displaying the frame free video stream on a frame free video display.

11. The method in accordance with claim 10, wherein the frame free video display modulates the light at each pixel in the display in a binary on/off manner.

12. The method in accordance with claim 10, wherein:
   the frame free video stream comprises multiple color channels;
   the display of each channel is respectively staggered at a predetermined interval.

13. The method in accordance with claim 12, wherein the interval comprises a bit plane interval divided by the number of color channels.

14. A system of transcoding frame-based video to frame free video, comprising:
   a receiver for receiving a frame-based video stream;
   an upconverter for upconverting the received frame-based video stream to produce an upconverted frame-based video stream at a higher frame rate than the received frame-based video stream;
   a sigma delta modulator for modulating the upconverted frame-based video stream using discrete time sigma delta modulation to produce a frame free video stream which comprises a series of bit planes which forms a continuous time video stream without any frame boundaries; and
   a frame free video display for displaying the frame free video stream.

15. A method of transcoding frame free video to frame-based video, comprising:
   receiving a frame free video stream, which comprises a series of bit planes which forms a continuous time video stream without any frame boundaries, at a bit plane rate of OSR*K;
   decimating the received frame free video stream by the OSR to produce a frame-based video stream at a frame rate of K.

16. The method in accordance with claim 15, wherein the decimating comprises low pass filtering and subsampling that results in multiple bits per pixel value.

17. The method in accordance with claim 15, wherein the decimating comprises motion adaptive decimation.

18. The method in accordance with claim 17, wherein the motion adaptive decimation is augmented by one of artificial intelligence or machine learning techniques.

19. The method in accordance with claim 15, further comprising;
   - deriving motion parameters from the frame free video stream; and
   - utilizing the motion parameters in the decimating process.

20. The method in accordance with claim 15, further comprising displaying the frame-based video stream on a conventional frame-based video display.

21. A system for transcoding frame free video to frame-based video, comprising:
   - a receiver for receiving a frame free video stream, which comprises a series of bit planes which forms a continuous time video stream without any frame boundaries, at a bit plane rate of OSR*K;
   - a transcoder for decimating the received frame free video stream by the OSR to produce a frame-based video stream at a frame rate of K; and
   - a frame-based video display for displaying the frame-based video stream.

\* \* \* \* \*